United States Patent
Ogawa et al.

(10) Patent No.: US 11,960,771 B2
(45) Date of Patent: Apr. 16, 2024

(54) STORAGE SYSTEM AND DATA MANAGEMENT METHOD

(71) Applicant: Hitachi, Ltd., Tokyo (JP)

(72) Inventors: Shugo Ogawa, Tokyo (JP); Ryosuke Tatsumi, Tokyo (JP); Yoshinori Ohira, Tokyo (JP); Hiroto Ebara, Tokyo (JP); Junji Ogawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 47 days.

(21) Appl. No.: 17/900,968

(22) Filed: Sep. 1, 2022

(65) Prior Publication Data
US 2023/0185489 A1 Jun. 15, 2023

(30) Foreign Application Priority Data
Dec. 9, 2021 (JP) ................................. 2021-200165

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0647* (2013.01); *G06F 3/0673* (2013.01)

(58) Field of Classification Search
CPC .... G06F 3/0659; G06F 3/0604; G06F 3/0647; G06F 3/0673; G06F 2212/7201; G06F 12/0246; G06F 2212/7205; G06F 3/061; G06F 12/0292; G06F 3/067
See application file for complete search history.

(56) References Cited

U.S. PATENT DOCUMENTS

| | | | |
|---|---|---|---|
| 9,921,781 B2 * | 3/2018 | Satoyama | G06F 3/0683 |
| 10,896,134 B2 * | 1/2021 | Byun | G06F 3/064 |
| 2008/0065836 A1 * | 3/2008 | Chen | G06F 3/0637 |
| | | | 711/147 |

(Continued)

FOREIGN PATENT DOCUMENTS

| | | | |
|---|---|---|---|
| JP | 6114397 B2 | 4/2017 | |
| JP | 2022-037404 A | 3/2022 | |

*Primary Examiner* — Shawn X Gu
*Assistant Examiner* — Mohammad S Hasan
(74) *Attorney, Agent, or Firm* — Volpe Koenig

(57) ABSTRACT

A first controller manages first mapping information for accessing data stored in a storage area, management of which is assigned to the first controller, and second mapping information for accessing data stored in a predetermined storage area, management of which is assigned to a second controller. The second controller, when having executed garbage collection on the predetermined storage area, changes mapping information to post-migration mapping information for accessing data after being migrated by the garbage collection. The first controller acquires the post-migration mapping information from the second controller, and updates the second mapping information using the post-migration mapping information when information in the second mapping information and is to be used for accessing the data in the predetermined storage area has been updated accompanying the garbage collection when the first controller accesses the data in the predetermined storage area after the garbage collection by using the second mapping information.

7 Claims, 24 Drawing Sheets

(56) References Cited

U.S. PATENT DOCUMENTS

| | | | |
|---|---|---|---|
| 2008/0201551 A1* | 8/2008 | Zhang | G06F 3/0635 |
| | | | 711/203 |
| 2013/0311700 A1* | 11/2013 | Chen | G06F 12/0292 |
| | | | 711/E12.008 |
| 2015/0127854 A1 | 5/2015 | Yamamoto | |
| 2015/0127895 A1* | 5/2015 | Malwankar | G06F 3/067 |
| | | | 711/103 |
| 2018/0052768 A1* | 2/2018 | Bae | G06F 12/0246 |
| 2018/0081556 A1* | 3/2018 | Lee | G06F 3/0683 |
| 2019/0317892 A1* | 10/2019 | Lee | G06F 3/0679 |
| 2022/0066664 A1 | 3/2022 | Ogawa | |
| 2023/0004303 A1* | 1/2023 | Yang | G06F 3/0625 |

\* cited by examiner

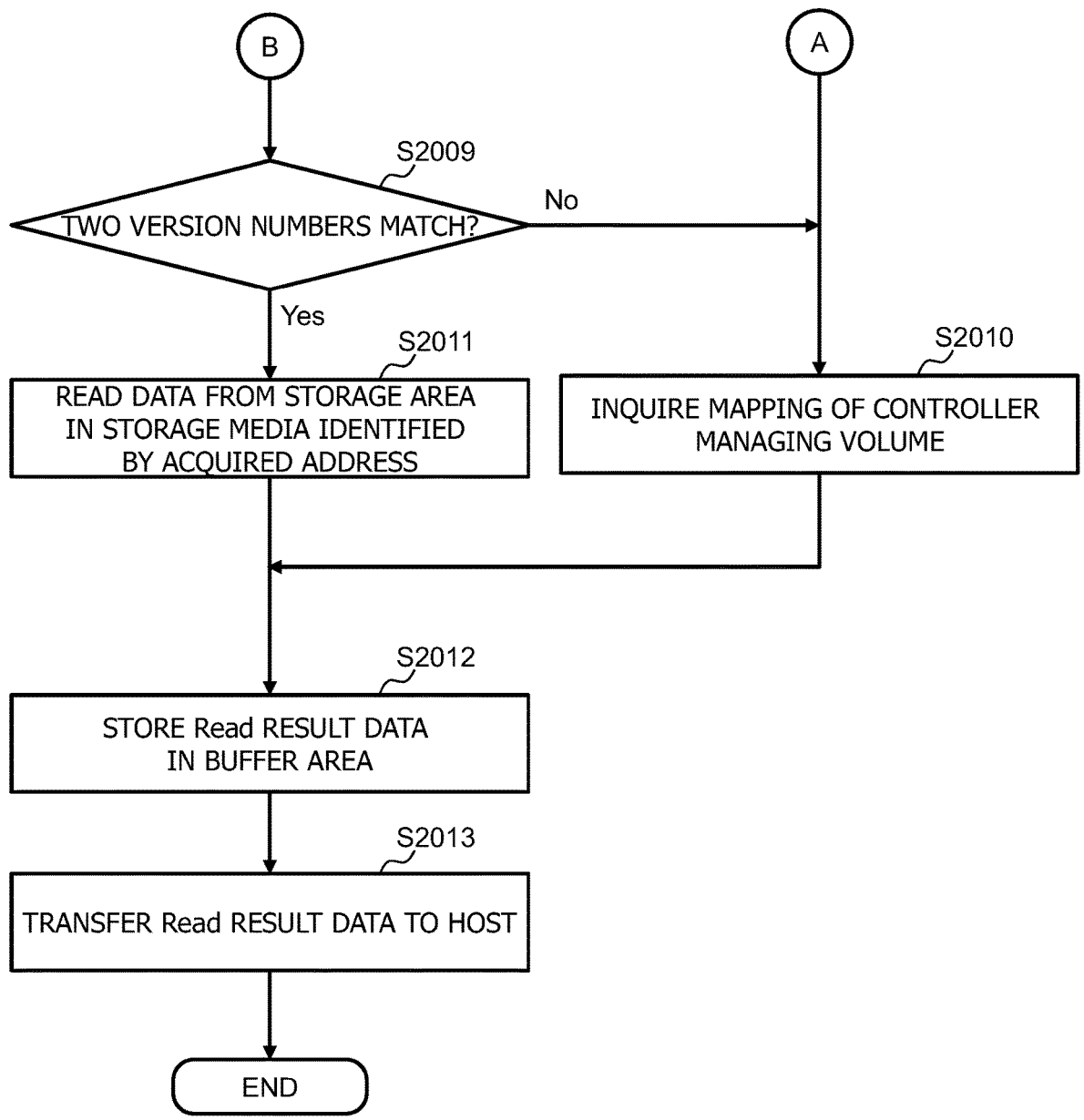

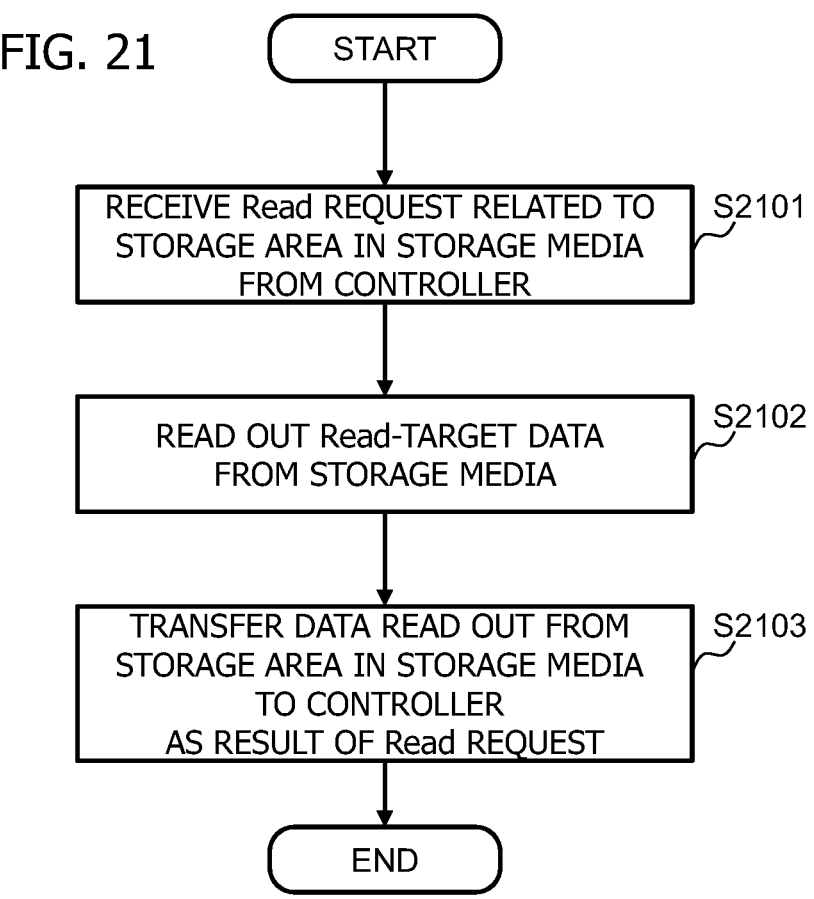

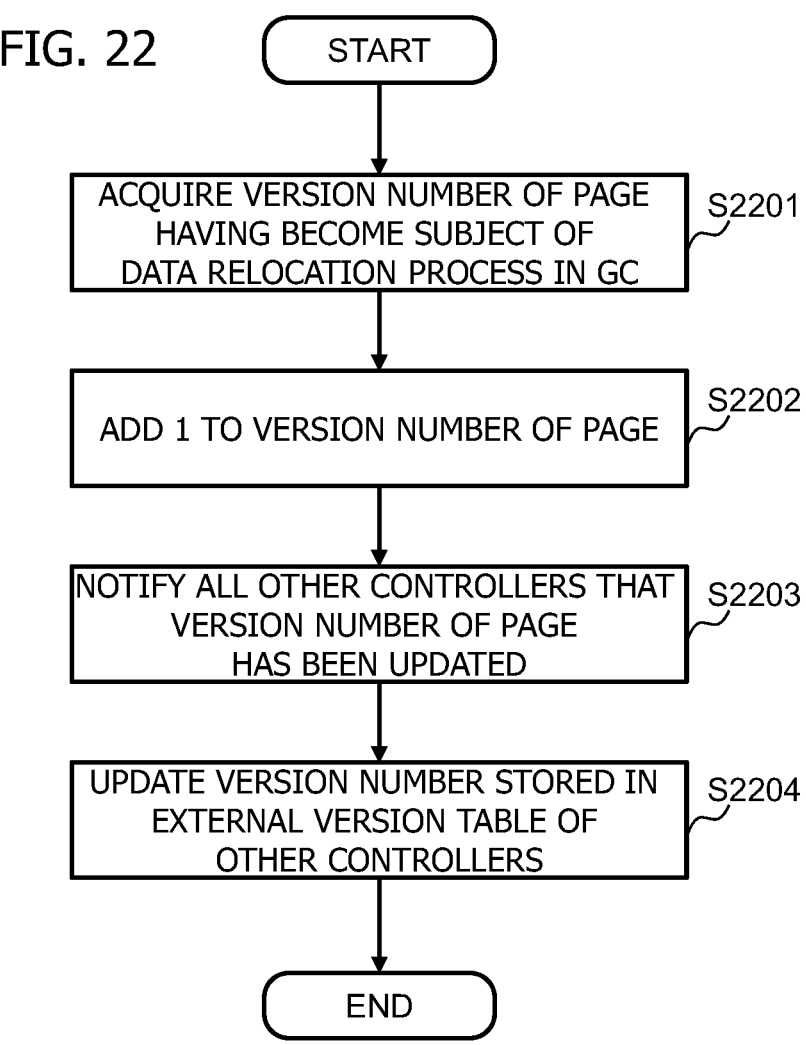

STORAGE SYSTEM AND DATA MANAGEMENT METHOD

BACKGROUND OF THE INVENTION

1. Field of the Invention

The present invention generally relates to a storage system that manages data in storage areas accessed by a plurality of nodes.

2. Description of the Related Art

With a storage system that provides high I/O performance to a host, it is possible to attempt to enhance the performance by distributing accessing processes to a plurality of controllers sharing storage media. In such a storage system, in order to reduce overheads of the accessing processes, preferably the process performance of the controllers is enhanced by eliminating inter-controller communication, and completing an accessing process within each controller.

For this purpose, first, when accessing processes are distributed to controllers, for example, it is necessary to assign the accessing processes in such units like logical units (LUs) that the accessing processes are independent of each other (hereinafter, collectively referred to as "LUs"). In addition, in order to prevent an imbalanced distribution of loads among a plurality of controllers, and enhance the resource use efficiency, it is required as well to make it possible to change controllers that are assigned processes of accessing LUs, and to migrate the LUs among the controllers. Each LU is recognized as an independent device, a storage area, or the like by an accessing host, it is therefore possible to eliminate inter-controller communication by limiting the controller that is assigned a process of accessing each LU to one controller (see Japanese Patent No. 6114397).

Then, it is necessary for each controller to have, as metadata, mapping information (hereinafter, referred to as "mapping information") representing storage-destination storage areas on storage media about data stored on LUs such that each controller can perform a process of accessing an assigned LU without communicating with other controllers. A controller that is assigned a process of accessing an LU accesses the LU by using mapping information related to data stored on the LU. That is, in a case where there is a single controller that is assigned a process of accessing each LU, inter-controller communication accompanying sharing of mapping information about each LU is unnecessary.

On the other hand, in a case where mapping information is shared among controllers in storage area management, each controller has a copy of the mapping information, and also communication occurs for notifying other controllers of updated contents when there is updating of the mapping information in each controller. For example, in a case where the storage system has a data deduplication functionality, it becomes necessary to perform deduplication among different LUs in order to enhance the advantage of less use of storage capacities enabled by data reduction. That is, because a plurality of LUs share storage areas and refer to stored data, corresponding mapping information needs to be shared among controllers.

In a case where mapping information is shared among LUs, preferably the frequency of inter-controller notification accompanying updating of the mapping information is reduced, and overheads due to communication in accessing processes are reduced. Updating of the mapping information occurs due to writing on LUs or garbage collection (GC) of storage areas. In storage area management like one based on a log structure used in a case of performing deduplication, processes of writing in LUs occur highly frequently as compared with GC. Accordingly, storage area management is required that can avoid inter-controller notifications due to the processes of writing in LUs.

Japanese Patent Application No. 2020-141524 discloses a technology related to a storage system in which a plurality of controllers share storage media, and inter-LU deduplication is performed. In the technology, each controller is assigned a storage area on which it individually performs management and updating, and data written on an LU is stored in a storage area managed by a controller that performs a process of accessing the LU. This technology makes it possible to prevent the influence of updating of mapping during processes of writing in LUs from going beyond the range of each controller, and avoid inter-controller notifications. In addition, Japanese Patent Application No. 2020 141524 discloses a technology for copying mapping information among controllers, and notifying about updating of mapping accompanying GC, and making the updating be reflected in the mapping information such that a controller can refer to data stored in a storage area managed by another controller in a case where controllers that perform processes of accessing LUs have been changed.

SUMMARY OF THE INVENTION

In GC of storage areas, inter-controller notifications are necessary in a case where a plurality of controllers share storage areas because updating of mapping information occurs accompanying relocation of valid data. At this time, mapping-information updating-subject LUs and notification-destination controllers are identified from the addresses (logical addresses) of LUs that refer to pieces of data to be relocated. At that time, reference to mapping information managing the correspondences between the addresses of the LUs and the addresses of storage areas in which relocation-subject data is stored occurs. In storage area management like one based on a log structure, mapping of data written in LUs is managed at granularity equivalent to Write from a host like 4 KiB, for example. Accordingly, the number of times of reference to mapping information in data relocation increases. In addition, since mapping of each LU is managed at fine granularity, the volume of mapping information necessary for storage area management increases, and mapping information that cannot be kept in a memory of a controller is stored on a lower-speed storage medium. In this case, overheads accompanying reference to mapping information increase further.

Therefore, in a storage system in which a plurality of controllers share storage areas that require GC, reference to mapping information occurs a lot in order to give notifications among the controllers about updating of mapping information accompanying data relocation due to GC. That is, it is required to reduce overheads accompanying reference to mapping information, and to avoid performance deterioration of GC and Write processes of controllers.

Japanese Patent Application No. 2020-141524 discloses a technology for handing over a process of GC to a node having mapping information, instead of notifying other controllers of updating of mapping information, in a data relocation process accompanying GC. However, mapping information representing the correspondence with the address of an LU that refers to data to be relocated is referred to in order to identify a controller to which the process of GC is handed over, and a method of reducing overheads of reference to mapping information is not disclosed.

The present invention has been made taking the matters mentioned above into consideration, and aims to propose a storage system and the like that can appropriately manage mapping information.

In order to solve the problems, in the present invention, a storage system includes a plurality of controllers, and a storage apparatus accessed by the plurality of controllers, data management of a storage area in the storage apparatus being assigned to one of the plurality of controllers, in which a first controller manages first mapping information for accessing data stored in a storage area, management of which is assigned to the first controller, and second mapping information for accessing data stored in a predetermined storage area, management of which is assigned to a second controller, the second controller, when having executed garbage collection on the predetermined storage area, changes mapping information for accessing the data stored in the predetermined storage area to post-migration mapping information for accessing data after being migrated by the garbage collection, and the first controller acquires the post-migration mapping information from the second controller, and updates the second mapping information by using the post-migration mapping information in a case where information that is in the second mapping information and is to be used for accessing the data in the predetermined storage area has been updated accompanying the garbage collection when the first controller accesses the data in the predetermined storage area after the garbage collection by using the second mapping information.

In the configuration described above, for example, when data in a storage area on which garbage collection has been executed is accessed by using mapping information, updating of the mapping information accompanying the garbage collection is executed to thereby avoid reference to the mapping information for the purpose of giving notifications about the updating among the controllers. According to the configuration described above, for example, it is possible to reduce overheads accompanying reference to mapping information in garbage collection, and to reduce performance deterioration of the garbage collection.

According to the present invention, mapping information can be managed appropriately. Problems, configuration and advantages other than those described above are made clear by the following explanations of embodiments.

BRIEF DESCRIPTION OF THE DRAWINGS

FIG. 20B is a figure depicting an example of the controller Read process according to the second embodiment;

FIG. 21 is a figure depicting an example of the storage medium Read process according to the second embodiment; and FIG. 22 is a figure depicting an example of the version management process according to the second embodiment.

DESCRIPTION OF THE PREFERRED EMBODIMENTS

Figure 1:
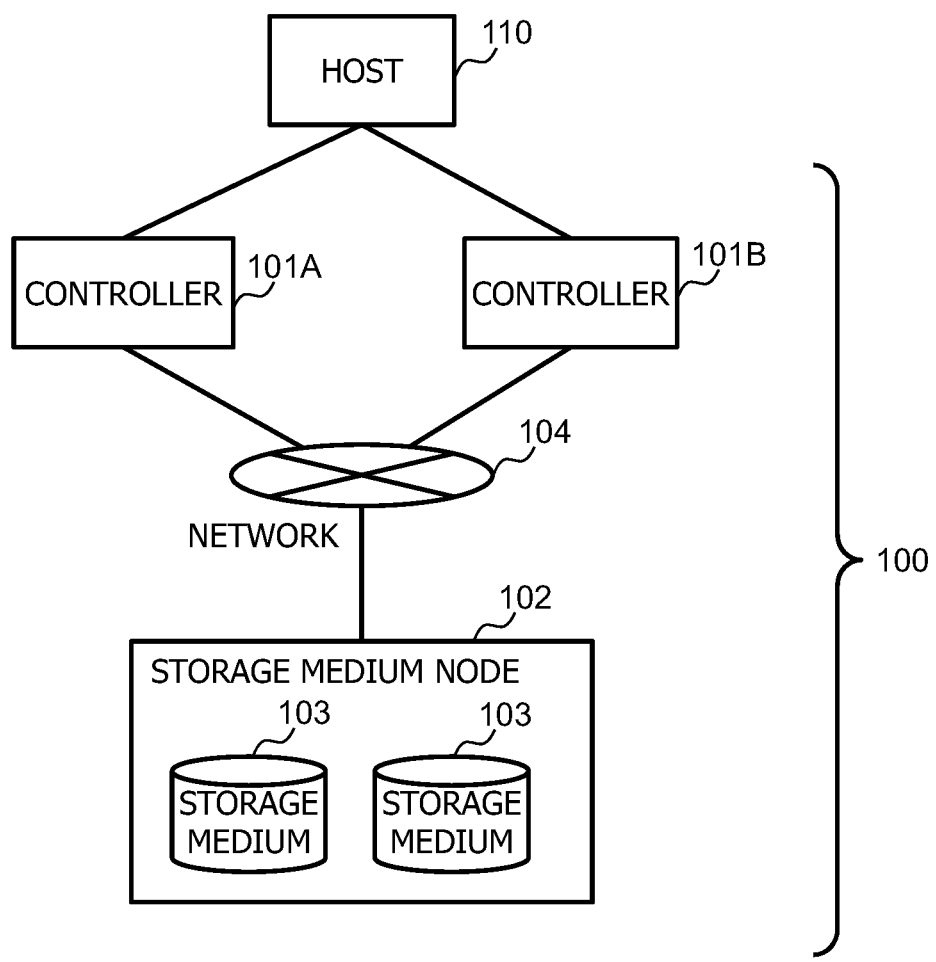
FIG. 1 is a figure depicting an example of configuration related to a storage system according to a first embodiment.

Embodiments of the present invention are mentioned in detail below. It should be noted that the present invention is not limited to the embodiments.

In order to reduce overheads accompanying reference to mapping information, instead of performing inter-controller updating notification about mapping information, a storage system according to the present embodiments checks whether or not mapping information has been updated when each controller accesses a shared storage area. Thereby, reference to mapping information necessary for identification of mapping-information updating-subject LUs and notification-destination controllers is avoided.

More specifically, the storage system assigns management of each storage area in the storage system to one of controllers. Only a controller that is assigned management of a storage area performs writing and GC of the storage area, and manages mapping information related to stored data. In the storage system, in a case where a first controller accesses data in a storage area managed by a second controller, the first controller acquires mapping information from the second controller, and performs only a Read process when accessing the storage area. In addition, data written in an LU is stored in a storage area managed by a controller that performs all processes of accessing the LU, including updating of stored data.

Each controller selects subject storage areas of GC in units of storage areas (hereinafter, referred to as "pages") with a certain size larger than that for a Write request from a host for a storage area managed by the controller, and performs a relocation process of valid data. In addition, a controller gives a version number to each page of a storage area managed by the controller, and updates the version number every time GC is executed.

In a case where a Read request for data in a storage area managed by a second controller is made in a process of accessing an LU, and the first controller does not have corresponding mapping information, the first controller acquires mapping information from the second controller managing the storage area. The second controller that has received a request for the mapping information notifies about, along with the requested mapping information, the version number of a page including data in the storage area.

In addition, when the version number of a page included in a storage area managed by a controller is updated due to GC, the controller notifies a node having a storage medium corresponding to the storage area or all other controllers about updating of the version number of the page on which the GC has been executed. The node or the controllers having received the notification about the updating of the version number retain(s) the version number of each page of the storage area, and update(s) the version number according to the notification.

Then, each controller processes an access request (Read request, Write request, etc.) for an LU by referring to mapping information retained by itself, and, in a case where the controller reads data stored in a storage area managed by another controller, refers to a version number corresponding to the mapping information retained by itself, and checks whether the mapping information has been updated. Within the controller or the node having the storage medium which is the notification destination of updating of the version number described above, it is checked whether or not mapping information has been updated.

In a case where it is checked at the node having the storage medium whether or not the mapping information has been updated, the controller identifies the address of the access-target storage area from mapping information retained by itself, and makes a Read request to the node having the storage medium. At this time, the controller includes, in the Read request, a version number corresponding to the mapping information along with the address described above. The node having the storage medium identifies a page corresponding to the Read-requested address, refers to the version number of the identified page, and checks whether the version number of the page and the version number included in the Read request match. In a case where the version numbers do not match, the node described above replies with an error message in response to the Read request of the controller, and thereby notifies that the mapping information referred to by the controller has been updated. Upon receiving the error message from the node having the storage medium, the controller inquires the latest mapping information of a controller managing the storage area, updates the mapping information retained by itself, and then makes a Read request to the storage medium again.

In a case where each controller checks whether or not mapping information has been updated, the controller identifies the address of an access-target storage area from mapping information retained by itself, and, before making a Read request to a node having the storage medium, compares a version number corresponding to the mapping information referred to and the latest version number of each page retained in the controller. In a case where the version numbers do not match, the controller inquires the latest mapping information of a controller managing the storage area, updates the mapping information, and then makes a Read request to the storage medium.

According to the configuration described above, at a time of an accessing process referring to mapping information at each controller, it is checked whether or not the mapping information has been updated accompanying GC, and thereby reference to mapping information for the purpose of giving notifications about the updating among the controllers is avoided. As a result, it is possible to reduce overheads accompanying reference to mapping information in accessing processes, and to reduce performance deterioration of GC and Write processes of controllers.

The use of words such as "first," "second," "third," and the like in the present specification and the like is for the purpose of identifying constituent elements, but do not necessarily limit numbers or orders. In addition, numbers for identification of constituent elements are used independently in each context, and numbers used in one context do not necessarily represent identical configurations in another context. In addition, a constituent element identified by a number is allowed to also carry out functionalities of a constituent element identified by another number.

(I) First Embodiment

In an example explained in the present embodiment, when a node (hereinafter, referred to as a "storage medium node") having storage media receives a Read request from a controller in a storage system in which a plurality of controllers share storage media, the storage medium node checks whether mapping information referred to by the controller has been updated. Note that the present embodiment does not limit claims in the present invention, and all elements that are explained in the embodiment are not necessarily necessary for a solution to the problems in the present invention.

Next, the present embodiment is explained on the basis of the figures. The following description and figures illustrate examples for explaining the present invention, and there are omissions and simplifications as appropriate for clarification of the explanation. The present invention can be implemented also in other various forms. Unless there is a particular limitation, the number of each constituent element can be either one or more than one.

Note that identical elements are given the same numbers in the figures, and explanations thereof are omitted as appropriate in the following explanation. In addition, in a case where elements of the same type are explained without distinctions being made thereamong, common portions (portions excluding sub-reference characters) in reference characters including the sub-reference characters are used, and in a case where elements of the same type are explained with distinctions being made thereamong, reference characters including sub-reference characters are used, in some cases. For example, in a case where controllers are explained without particular distinctions being made thereamong, they are described as "controllers 101," and in a case where the controllers are explained with distinctions being made among the individual controllers, they are called a "controller 101A," a "controller 101B," and the like, in some cases.

FIG. 1 is a figure depicting an example of configuration related to a storage system 100 according to the present embodiment.

The storage system 100 includes a plurality of controllers 101 (controller nodes), a storage medium node 102, storage media 103 connected to the storage medium node 102, and a network 104 connecting the controllers 101 and the storage medium node 102 to each other. In addition, the controllers 101 are connected with a host 110 that makes an access request to the storage system 100.

The controllers 101 give the host 110 access to a storage. The storage is provided to the host 110 in the form of an LU mapped to a storage area in the storage media 103. The controllers 101 may provide a plurality of LUs to the host 110. In addition, only a single controller 101 gives access to each LU at a time.

The storage medium node 102 is an example of a storage apparatus, has the storage media 103 to which storage areas of LUs are mapped, and gives the controllers 101 access to the storage media 103. The plurality of controllers 101 share the storage media 103 of the storage medium node 102, and any controller 101 can directly access the storage media 103 bypassing other controllers 101.

The storage media 103 provide storage areas assigned to LUs constructed by the controllers 101. The storage media 103 are shared by the controllers 101, and accessed through the network 104.

The network 104 connects the controllers 101 and the storage medium node 102 with each other, communicates with the controllers 101, and performs the transfer of access requests from the controllers 101 to the storage media 103 connected to the storage medium node 102, and each piece of data and the like related to the access requests.

The host 110 makes an access request to an LU provided by a controller 101.

Whereas a controller 101A and a controller 101B are mentioned as examples of the plurality of controllers 101 in the explanation below, in addition to the controller 101A and the controller 101B, additional controllers 101 may be connected to the network 104, and share the storage media 103 of the storage medium node 102. In addition, the storage medium node 102 may give access to a plurality of the storage media 103 at a time. Additionally, the configuration of the network 104 is not limited to the one in FIG. 1, and, for example, the host 110 may be connected to the network 104, and the host 110 may make an access request to a controller 101, in other possible configuration.

Figure 2:
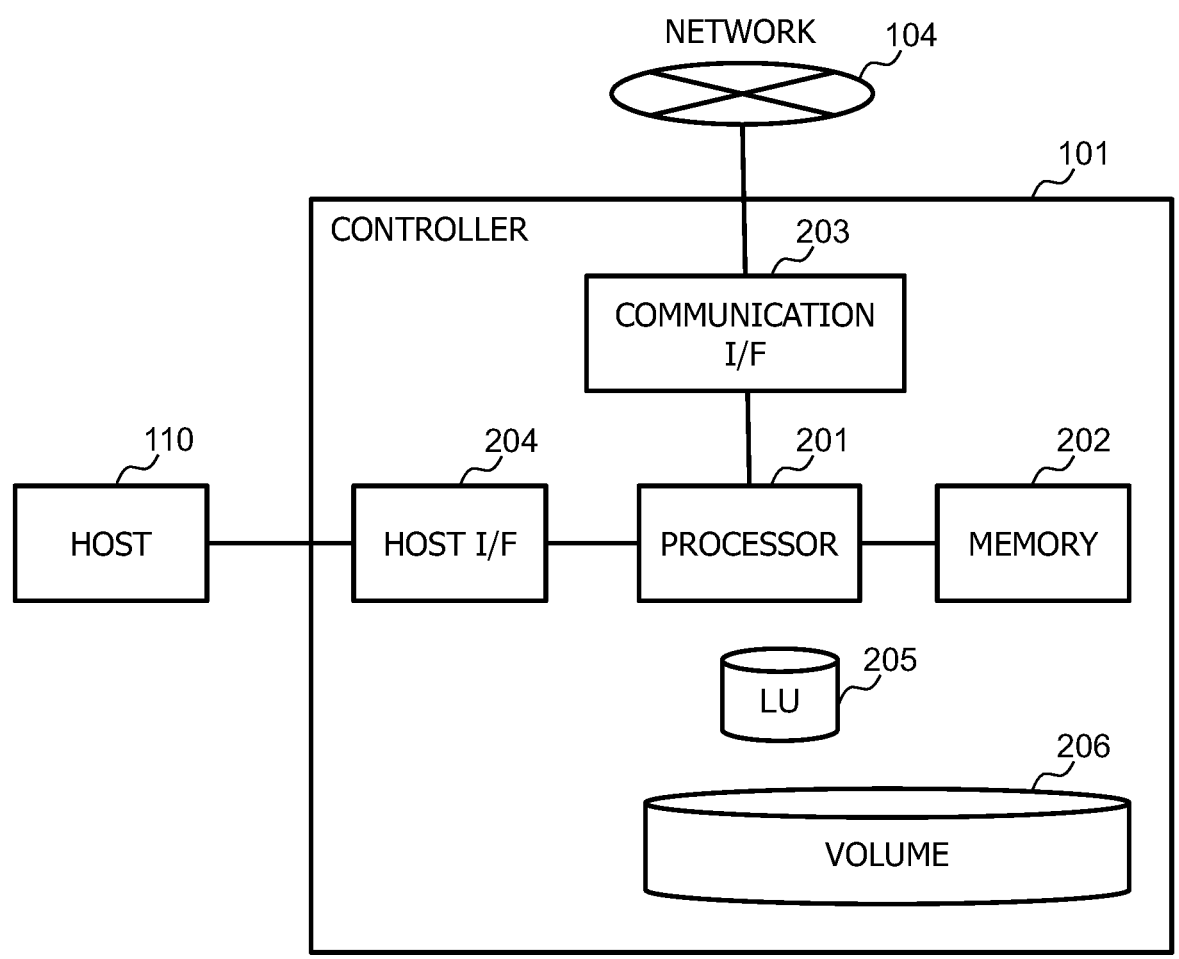
FIG. 2 is a figure depicting an example of configuration related to controllers according to the first embodiment.

FIG. 2 is a figure depicting an example of configuration related to the controllers 101. Note that the controller 101A and the controller 101B have similar configuration, and therefore, are not depicted or explained separately.

A controller 101 includes one or more processors 201, one or more memories 202, one or more communication interfaces 203, one or more host interfaces 204, one or more LUs 205, and one or more volumes 206.

The processors 201 execute a program that realizes a controller functionality by using the memories 202, and give the host 110 access to the LUs 205.

The memories 202 store programs to be operated on the processors 201, metadata to be used by the programs, data that needs to be stored temporarily, and the like.

The communication interfaces 203 are connected to the network 104, and perform: transmission of access requests from the controller 101 to the storage media 103 connected to the storage medium node 102; reception of responses; and data transfer of Read data (data read out from the storage media 103), Write data (data to be written in the storage media 103), and the like accompanying processes performed in response to access requests.

A communication standard used for connection between the communication interfaces 203 and the network 104 is not limited particularly as long as it enables the transmission and reception of access requests and responses, and data transfer that are described above. In addition, similarly, a protocol to be used in transmission and reception of access requests, responses, and data, which are performed between the controller 101 and the storage medium node 102, is also not limited.

The host interfaces 204 perform: reception of access requests from the host 110 to the LUs 205; transmission of responses; and data transfer, between itself and the host 110, of Read data, Write data, and the like accompanying processes performed in response to access requests.

A communication standard and a protocol used for connection between the controller 101 and the host 110 via the host interfaces 204 are not limited particularly as long as they enable the transmission and reception of access requests and responses, and data transfer that are described above. In addition, in a case where the host 110 is connected to the network 104, the host interfaces 204 may use configuration common to themselves and the communication interfaces 203.

The LUs 205 are virtual storage areas that are controlled by a program operating on the processors 201, and associated with addresses of the volumes 206, and are provided as storage media that the host 110 can access through the host interfaces 204. In addition, control of the LUs 205 can be reassigned between controllers 101 by translating mapping information about the volumes 206 in advance between the controllers 101.

The volumes 206 are virtual storage areas that are controlled by a program operating on the processors 201, and constructed by using storage areas that are included in storage areas in the storage media 103, and assigned to the controller 101. Each address of the volumes 206 is associated with a storage area in the storage media 103, and the host 110 accesses a storage area in the storage media 103 after the address of an LU 205 is translated into the address of a volume 206, and then is translated into the address of the storage area in the storage media 103.

Figure 3:
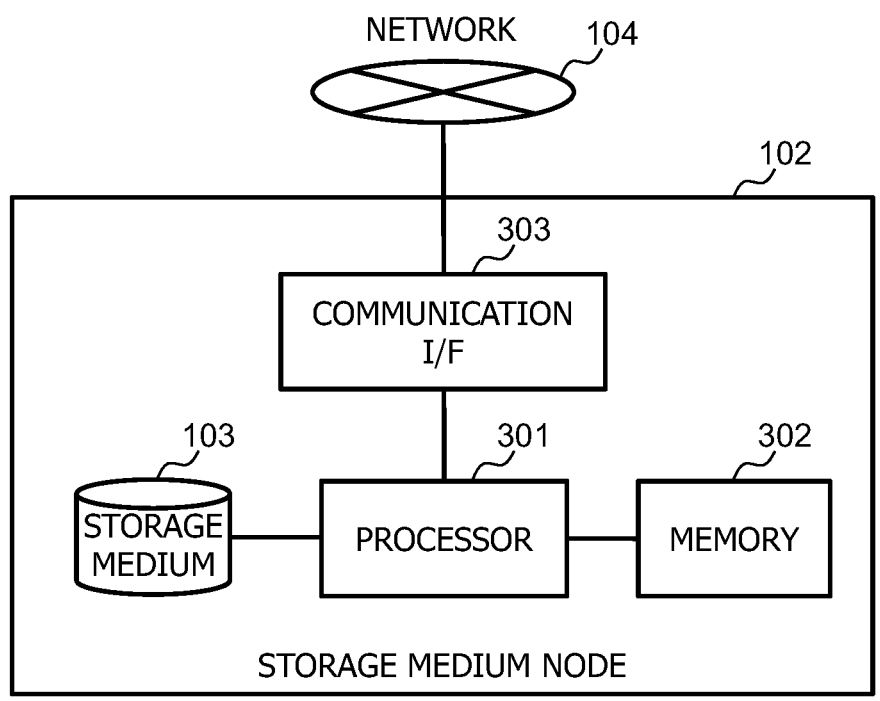
FIG. 3 is a figure depicting an example of configuration related to a storage medium node according to the first embodiment.

FIG. 3 is a figure depicting an example of configuration related to the storage medium node 102. In addition to the one or more storage media 103 connected thereto, the storage medium node 102 includes one or more processors 301, one or more memories 302, and one or more communication interfaces 303.

The processors 301 execute a program that realizes a functionality of accessing the storage media 103 by using the memories 302, and accesses the storage media 103 according to an access request from a controller 101.

The memories 302 store programs to be operated on the processors 301, metadata to be used by the programs, data that needs to be stored temporarily, and the like.

The communication interfaces 303 are connected to the network 104, and perform: reception of access requests from the controller 101 to the storage media 103; transmission of responses; and data transfer of Read data, Write data, or the like accompanying processes performed in response to access requests.

A communication standard used for connection between the communication interfaces 303 and the network 104 is not limited particularly as long as it enables the transmission and reception of access requests and responses, and data transfer that are described above. In addition, similarly, a protocol to be used in transmission and reception of access requests, responses, and data performed between the controller 101 and the storage medium node 102 is also not limited.

Figure 4:
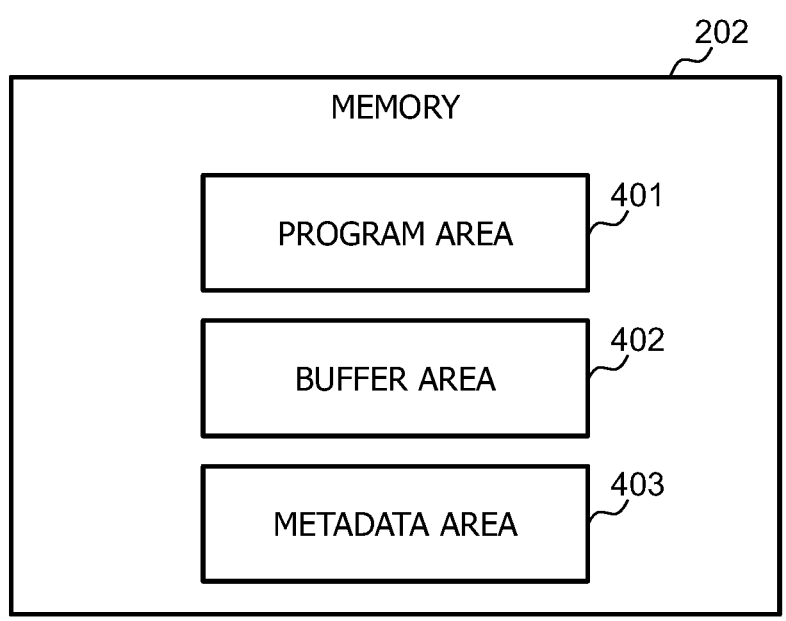
FIG. 4 is a figure depicting an example of areas in memories included in a controller according to the first embodiment.

FIG. 4 is a figure depicting an example of areas (the configuration of stored data) in the memories 202 included in the controller 101. The memories 202 include a program area 401, a buffer area 402, and a metadata area 403.

The program area 401 stores a program that is executed by the processors 201, and executes a controller functionality of the storage system 100.

The buffer area 402 temporarily stores Read data from the storage media 103 connected to the storage medium node 102 or Write data to be written into the storage media 103.

The metadata area 403 stores management information related to a process of each LU 205 which the controller 101 gives the host 110 access to.

Figure 5:
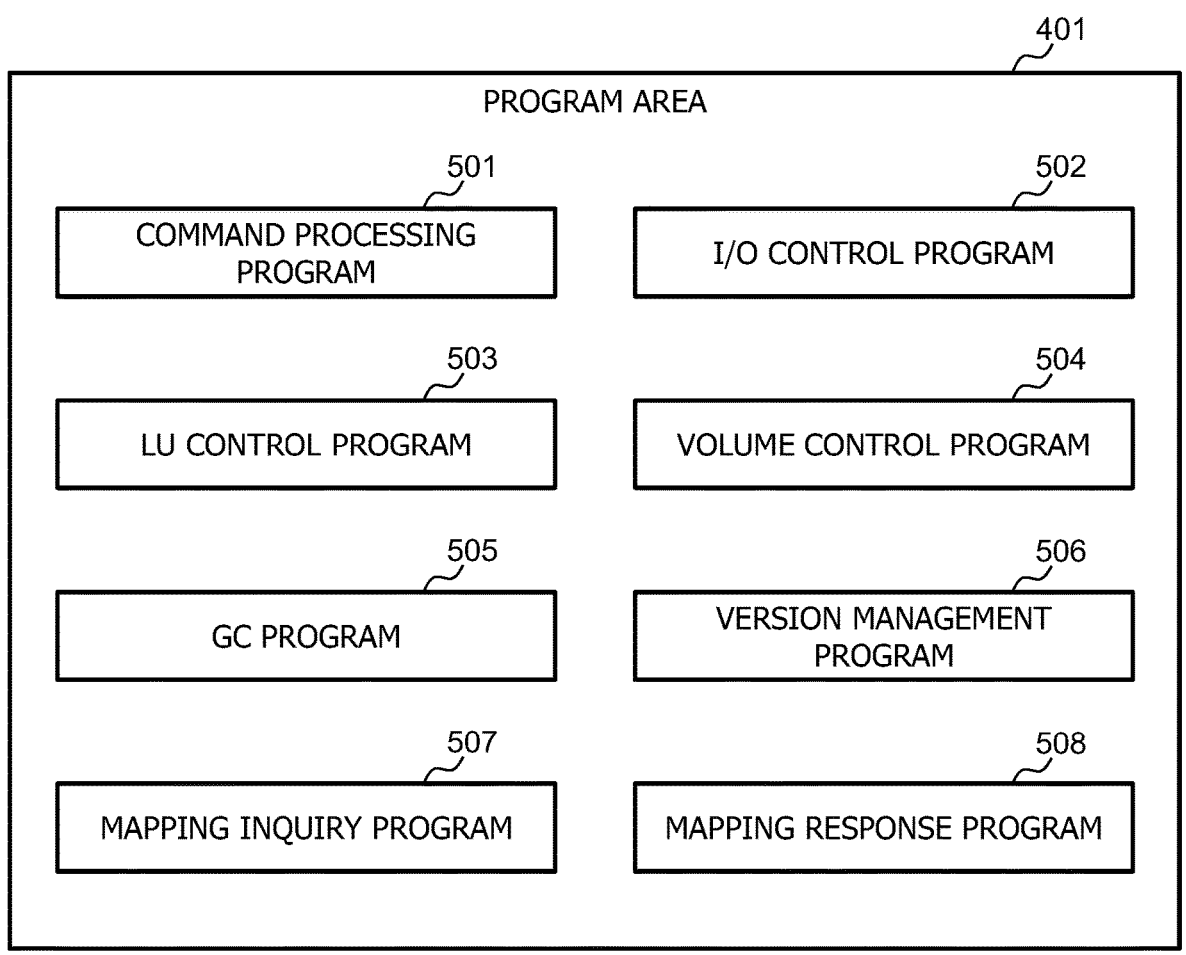
FIG. 5 is a figure depicting an example of the configuration of a program area included in the memories of the controller according to the first embodiment.

FIG. 5 is a figure depicting an example of the configuration of the program area 401 included in the memories 202 of the controller 101.

The program area 401 stores a command processing program 501, an I/O control program 502, an LU control program 503, a volume control program 504, a GC program 505, a version management program 506, a mapping inquiry program 507, and a mapping response program 508.

Via the host interfaces 204, the command processing program 501 performs reception of access requests from the host 110 to the LUs 205, and gives responses to results corresponding to the access requests. For example, the command processing program 501 starts a process corresponding to a Read request, and transmits data (result data) corresponding to the Read request to the host 110 via the host interfaces 204. In addition, for example, the command processing program 501 starts a process corresponding to a Write request, and transmits data (result data) corresponding to the Write request to the host 110 via the host interfaces 204.

The I/O control program 502 executes a Read request and a Write request to the storage media 103 connected to the storage medium node 102 via the communication interfaces 203. In addition, when making a Read request to the storage media 103, the I/O control program 502 notifies the storage medium node 102 of the version number of a page related to mapping information referred to as well. A protocol to be used for accessing the storage media 103 from the I/O control program 502 is not limited particularly as long as it enables Read access and Write access to a specified address.

The LU control program 503 manages mapping between the address space of the volumes 206 and the address space of the LUs 205 which the controller 101 gives the host 110 access to, and performs translation of the address of an LU 205 to the address of a volume 206. In addition, the LU control program 503 manages mapping information related to each address of the LUs 205 in association with the version number of a page at a timing of inquiry about mapping.

The volume control program 504 manages mapping between the address space of the volumes 206 that are virtual storage areas with which the address space of the LUs 205 is associated and storage areas in the storage media 103 connected to the storage medium node 102. The volume control program 504 performs bidirectional address translation between the addresses of the volumes 206 and addresses representing storage areas in the storage media 103.

The GC program 505 performs a relocation process by migrating, to another page, valid data included in a page in a storage area that is included in storage areas configured by using the storage media 103 connected to the storage medium node 102, and is managed by the controller 101. At this time, the GC program 505 updates mapping of the address of a volume 206 that has been associated with a storage area from which the data has been relocated, and associates the address with a storage area to which the data has been relocated. In addition, the GC program 505 instructs the version management program 506 to update the version number of the processing-subject page.

The version management program 506 updates the version number of the page as instructed by the GC program 505, and notifies the storage medium node 102 via the communication interfaces 203 that the version number of the page has been updated.

The mapping inquiry program 507 receives, from the LU control program 503, the address of a volume 206 managed by another controller 101, and inquires the controller 101 managing a storage area corresponding to mapping information via the communication interfaces 203. Then, the mapping inquiry program 507 responds to the LU control program 503 with mapping information received from the inquired controller 101 via the communication interfaces 203, and the version number of a page corresponding to the mapping information.

The mapping response program 508 receives an inquiry request for mapping information to the controller 101 from another controller 101 via the communication interfaces 203, and acquires the address of a storage area in the storage media 103 corresponding to the address of a requested volume 206. In addition, the mapping response program 508 acquires, through the version management program 506, the version number of a page including the address of the storage area described above. Then, via the communication interfaces 203, the mapping response program 508 responds to the controller 101 that has made the inquiry request with the acquired address of the storage area in the storage media 103 and the version number of the page.

Figure 6:
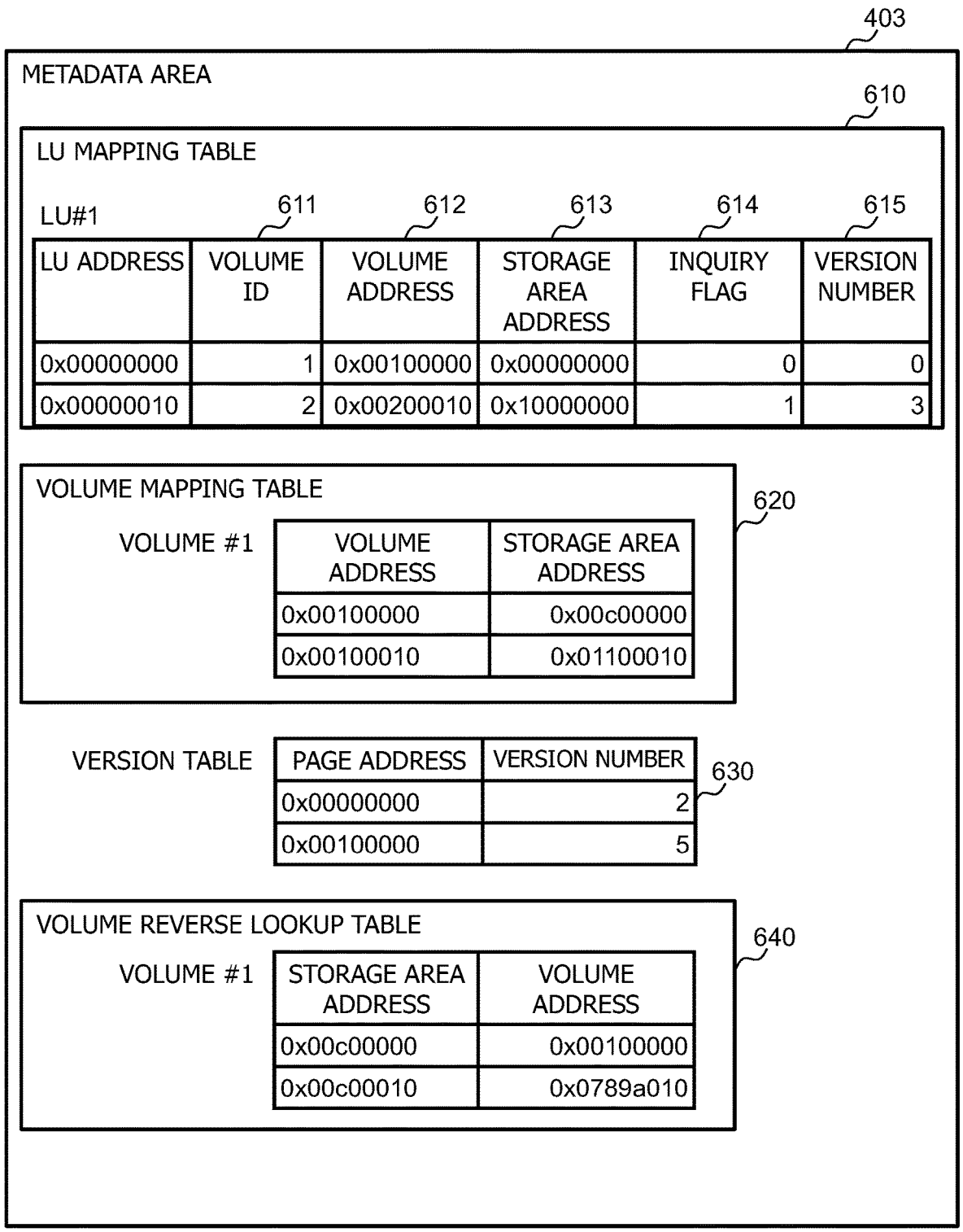
FIG. 6 is a figure depicting an example of the configuration of a metadata area included in the memories of the controller according to the first embodiment.

FIG. 6 is a figure depicting an example of the configuration of the metadata area 403 included in the memories 202 of the controller 101.

The metadata area 403 includes an LU mapping table 610, a volume mapping table 620, a version table 630, and a volume reverse lookup table 640.

The LU mapping table 610 stores the address of a volume 206 corresponding to the address of each LU 205. In addition, in a case where the address of an LU 205 corresponds to the address of a volume 206 managed by another controller 101, the LU mapping table 610 stores the address of a storage area in the storage media 103 as the result of an inquiry about mapping information. In order to store the two types of address described above, the LU mapping table 610 has an entry corresponding to the address of each LU 205. The entry includes: a volume ID 611 (volume number) representing a volume 206 corresponding to the entry; a volume address 612 storing the address of the volume 206; a storage area address 613 storing the address of a storage area in the storage media 103 that is a result of an inquiry about mapping information; and an inquiry flag 614 representing whether or not the address that is the result of the inquiry is stored in the storage area address 613. In addition, the entry described above includes a version number 615 representing the version number of a page acquired at a time of an inquiry made to another controller 101 about mapping.

The LU mapping table 610 may use not only the format depicted in FIG. 6, but, for example, a value other than "0" and "1" may be used as the inquiry flag 614. In addition, whether or not an address as the result of the inquiry about the mapping information is stored may be represented by storing, in the storage area address 613, a particular address value representing invalidity instead of omission of the inquiry flag 614.

The volume mapping table 620 is provided for each volume 206 for which the controller 101 performs an accessing process, and stores the address of a storage area in the storage media 103 corresponding to the address of each volume 206 retained by the controller 101.

The version table 630 stores the version number of each page included in a storage area in the storage media 103 managed by the controller 101.

The volume reverse lookup table 640 is provided for each volume 206 for which the controller 101 performs an accessing process, and stores the address of a volume 206 corresponding to the address of each storage area in the storage media 103 managed by the controller 101.

Figure 7:
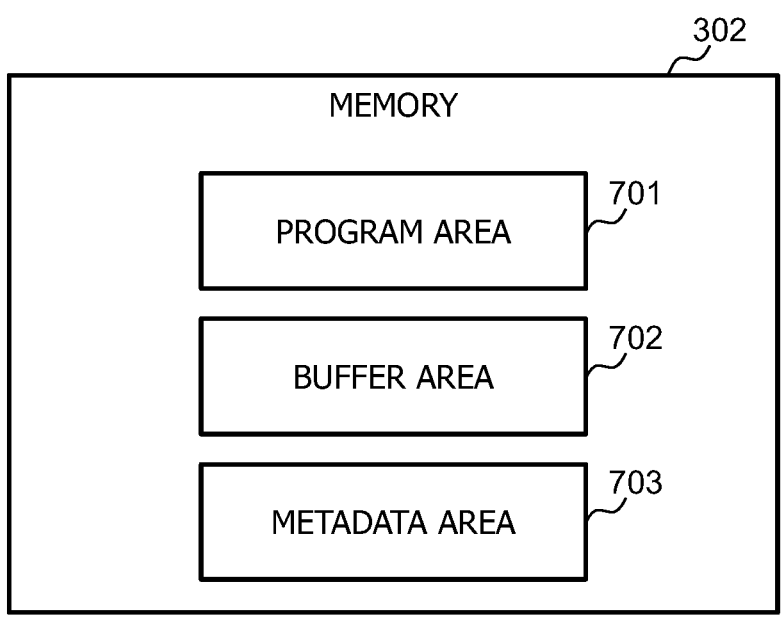
FIG. 7 is a figure depicting an example of areas in memories included in the storage medium node according to the first embodiment.

FIG. 7 is a figure depicting an example of areas (the configuration of stored data) in the memories 302 included in the storage medium node 102. The memories 302 include a program area 701, a buffer area 702, and a metadata area 703.

The program area 701 stores a program that is executed by the processors 301, and executes a controller functionality of the storage system 100.

The buffer area 702 temporarily stores Read data from the storage media 103 or Write data to be written into the storage media 103.

The metadata area 703 stores the version number of each page included in a storage area in the storage media 103.

Figure 8:
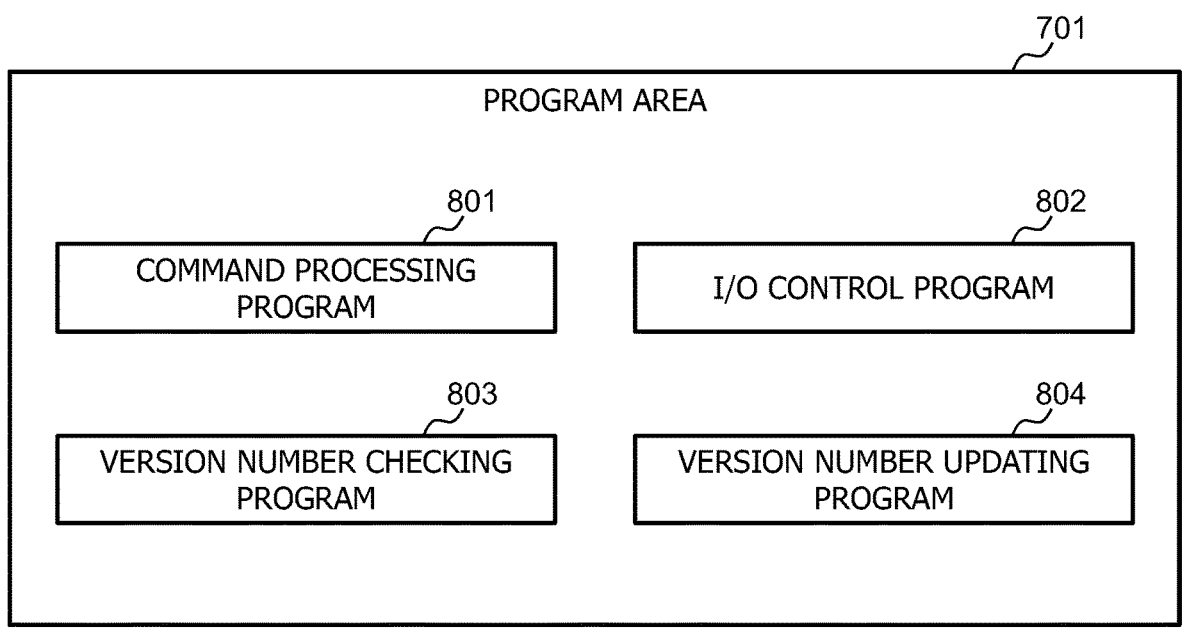
FIG. 8 is a figure depicting an example of the configuration of a program area included in the memories of the storage medium node according to the first embodiment.

FIG. 8 is a figure depicting an example of the configuration of the program area 701 included in the memories 302 of the storage medium node 102.

The program area 701 stores a command processing program 801, an I/O control program 802, a version number checking program 803, and a version number updating program 804.

The command processing program 801 receives a Read request and a Write request to the storage media 103 from a controller 101 via the communication interfaces 303, and responds with results. In addition, when receiving a Read request from a controller 101, the command processing program 801 also receives the version number of mapping information referred to by the controller 101 as well.

The I/O control program 802 executes a Read request and a Write request to the storage media 103.

The version number checking program 803 identifies a page that is specified by the command processing program 801, and corresponds to an access-target address, and compares the current version number of the identified page and the version number of the mapping information received from the controller 101 along with the Read request. In a case where the version number of the Read request and the current version number of the page do not match, the version number checking program 803 determines that the controller 101 has made the Read request by using un-updated mapping information, and gives the command processing program 801 a notification instructing to respond to the controller 101 that has made the Read request with an error message that the mapping information referred to by the controller 101 has been updated.

Via the communication interfaces 303, the version number updating program 804 receives the address of a page, and a new version number from a controller 101, and updates information that is retained by the storage medium node 102, and is about the version number of each page. A notification related to updating of the version number of a page that the version number updating program 804 receives from the controller 101 is not limited to the format described above. For example, in a case where the version number of each page starts from "0," and "1" is necessarily added thereto at a time of updating, the version number of each page retained by the storage medium node 102 is initialized to "0" in advance, and only the addresses of pages whose version numbers have been changed may be received from controllers 101, in one possible format.

Specifications of Read requests and Write requests that the command processing program 801 receives from controllers 101 are not limited particularly as long as they enable the operation described above. For example, the version number of mapping information received along with a Read request may not be given, in the Read request, a dedicated field where the version number is stored, but a higher-order bit of an address therein may be used as a version number, in one possible format, or another format may be used.

Figure 9:
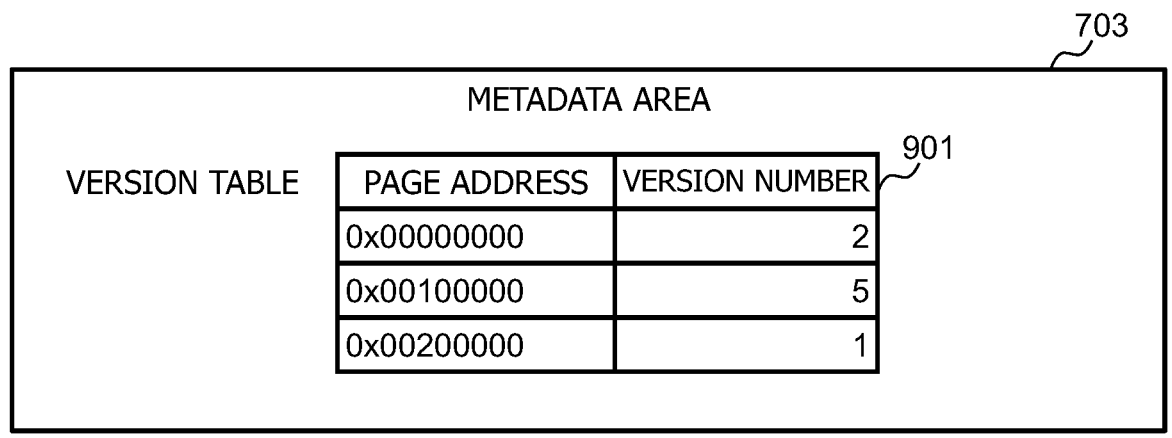
FIG. 9 is a figure depicting an example of the configuration of a metadata area included in the memories of the storage medium node according to the first embodiment.

FIG. 9 is a figure depicting an example of the configuration of the metadata area 703 included in the memories 302 of the storage medium node 102.

The metadata area 703 includes a version table 901. The version table 901 stores the current version number of each page included in a storage area in the storage media 103.

Figure 10A:
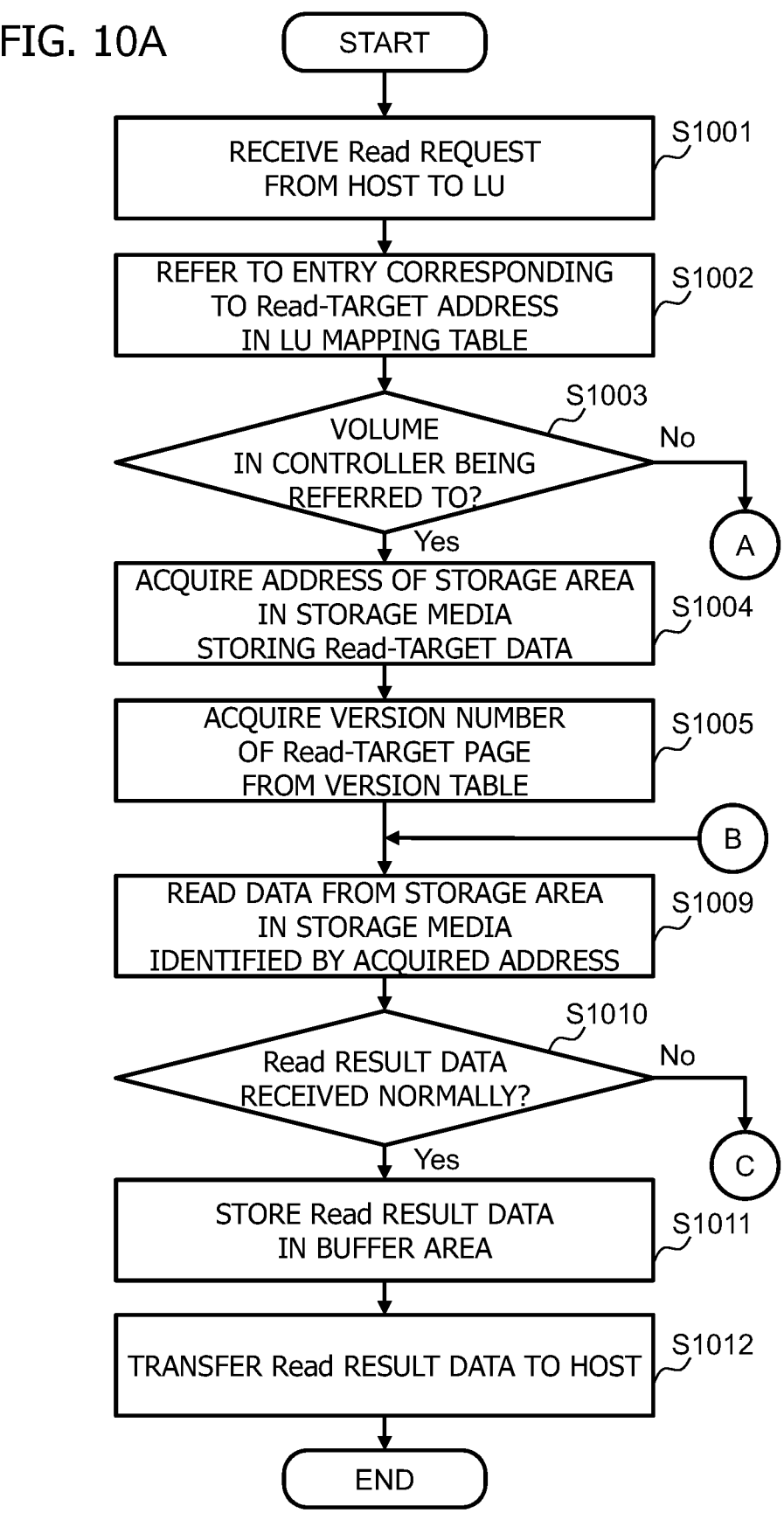
FIG. 10A is a figure depicting an example of a controller Read process according to the first embodiment.
Figure 10B:
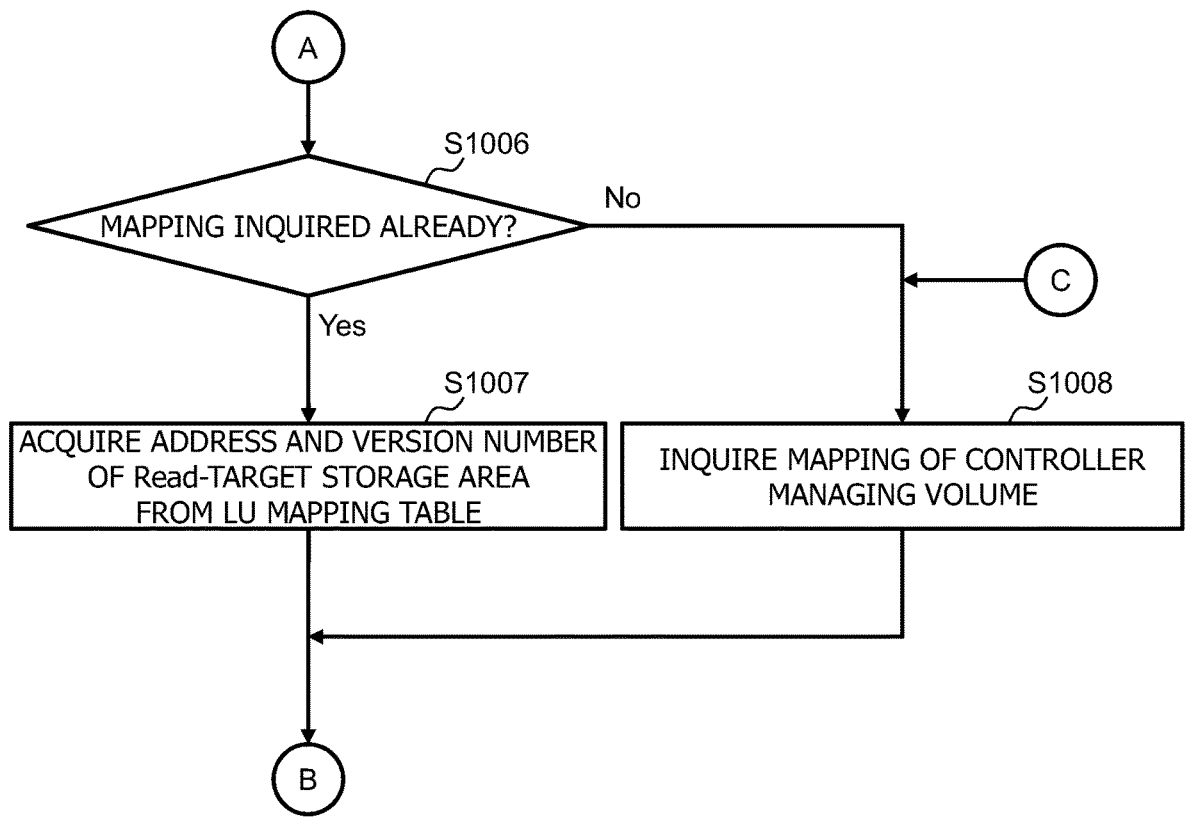
FIG. 10B is a figure depicting an example of the controller Read process according to the first embodiment.

FIG. 10A and FIG. 10B are figures depicting an example of a flowchart (controller Read process) depicting the flow of a series of processes that are related to a Read request from the host 110 to an LU 205, and performed at the controller 101A. Operation based on the flowchart in FIG. 10A and FIG. 10B are as follows.

Step S1001: The command processing program 501 of the controller 101A receives the Read request from the host 110 to the LU 205 via the host interfaces 204. Subsequently, Step S1002 is executed.

Step S1002: The LU control program 503 receives a Read-target address (e.g. the address of the LU 205) from the command processing program 501, and refers to an entry corresponding to the Read-target address in the LU mapping table 610 in the metadata area 403 in the memories 202. Subsequently, Step S1003 is executed.

Step S1003: The LU control program 503 refers to the volume ID 611 in the entry referred to at Step S1002 and the volume mapping table 620, and checks whether the controller 101A has a volume 206 which is being referred to. In a case where it is checked as a result that the controller 101A manages the volume 206 being referred to, Step S1004 is executed. Otherwise, that is, in a case where the controller 101B manages it, Step S1006 is executed.

Step S1004: The volume control program 504 refers to the volume mapping table 620 corresponding to the volume ID 611 included in the entry referred to at Step S1002. Then, the volume control program 504 refers to an entry in the volume mapping table 620 corresponding to the volume address 612 included in the entry referred to at Step S1002, and acquires the address of a storage area in the storage media 103 corresponding to the address of the Read-target LU 205. Subsequently, Step S1005 is executed.

Step S1005: The volume control program 504 identifies the address of a page including the address of the storage area in the storage media 103 acquired at Step S1004. Then, the volume control program 504 refers to the version table 630 stored in the metadata area 403 in the memories 202, and acquires the current version number of the identified page from the identified address of the page. Subsequently, Step S1009 is executed.

Step S1006: The LU control program 503 refers to the inquiry flag 614 included in the entry referred to at Step S1002, and checks whether the mapping has already been inquired. In a case where the mapping has already been inquired, Step S1007 is executed, and in a case where the mapping has not already been inquired (in a case where an inquiry has not been executed), Step S1008 is executed.

Step S1007: The LU control program 503 refers to the LU mapping table 610, and acquires the storage area address 613 and version number 615 included in the entry referred to at Step S1002 as the address of a storage area in the storage media 103 corresponding to the address of the Read-target LU 205, and as the version number of a page corresponding to the address of the Read-target LU 205. Subsequently, Step S1009 is executed.

Step S1008: The mapping inquiry program 507 inquires, of the controller 101B managing the volume 206, mapping information related to the volume ID 611 and volume address 612 included in the entry referred to at Step S1002. Then, as an inquiry result from the controller 101B, the mapping inquiry program 507 acquires the address of a storage area in the storage media 103 corresponding to the volume ID 611 and volume address 612 that are described above, and the version number of a page including the address. The mapping inquiry program 507 stores the acquired address and version number in the storage area address 613 and version number 615 that are included in the entry in the LU mapping table 610 referred to at Step S1002, and sets the inquiry flag 614 in the entry to "1." Subsequently, Step S1009 is executed.

Step S1009: Via the communication interfaces 203, the I/O control program 502 makes a Read request to the storage medium node 102 for the acquired address in the storage area in the storage media 103. In addition, the I/O control program 502 stores the acquired version number of the page in the Read request described above, and transmits the Read request to the storage medium node 102 along with the Read-target address. Subsequently, Step S1010 is executed.

Step S1010: The I/O control program 502 receives a response to the Read request made at Step S1009 from the storage medium node 102 via the communication interfaces 203. In a case where the I/O control program 502 normally receives Read result data from the storage medium node 102, Step S1011 is executed, and in a case where the I/O control program 502 receives an error message that the version number does not match, that is, the mapping information has been updated, Step S1008 is executed.

Step S1011: The I/O control program 502 stores, in the buffer area 402 in the memories 202, the Read result data received from the storage medium node 102. Subsequently, Step S1012 is executed.

Step S1012: The command processing program 501 transfers the Read result data stored in the buffer area 402 to the host 110 via the host interfaces 204 as the result of the Read request, and ends the series of operation.

Figure 11:
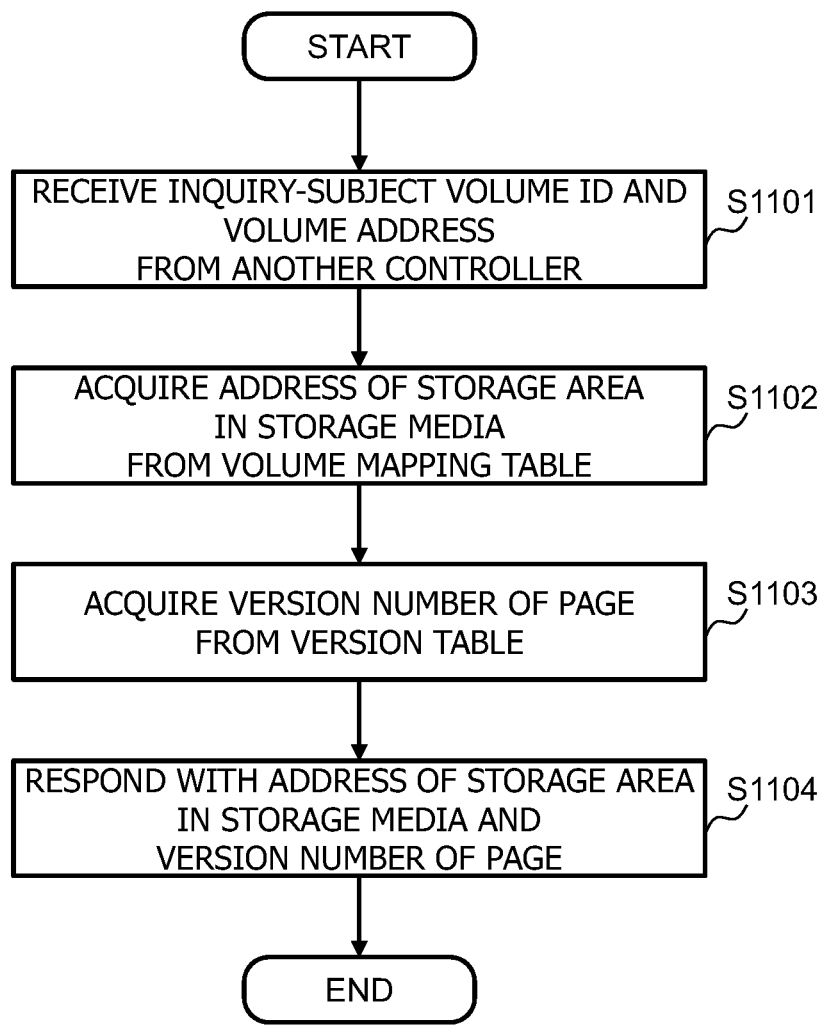
FIG. 11 is a figure depicting an example of an inquiry process according to the first embodiment.

FIG. 11 is a figure depicting an example of a flowchart (inquiry process) depicting the flow of a series of processes performed by the controller 101B as a response to an inquiry about mapping from the controller 101A at Step S1008 in the flowchart in FIG. 10B. Operation based on the flowchart in FIG. 11 is as follows.

Step S1101: The mapping response program 508 of the controller 101B receives the mapping-inquiry-subject volume ID and volume address from the controller 101A via the communication interfaces 203. Subsequently, Step S1102 is executed.

Step S1102: The mapping response program 508 refers to a volume mapping table 620 that is included in volume mapping tables 620 stored in the metadata area 403 in the memories 202 of the controller 101B, and corresponds to a volume 206 specified by the mapping-inquiry-subject volume ID. Then, the mapping response program 508 refers to an entry that is included in the volume mapping table 620, and corresponds to the volume address specified as the inquiry subject, and acquires a storage area address (the address of a storage area in the storage media 103) included in the entry. Subsequently, Step S1103 is executed.

Step S1103: The mapping response program 508 identifies the address of a page including the address of the storage area in the storage media 103 acquired at Step S1102, and refers to the version table 630 stored in the metadata area 403 in the memories 202. Then, the mapping response program 508 acquires the current version number of the identified page from the version table 630. Subsequently, Step S1104 is executed.

Step S1104: Via the communication interfaces 203, the mapping response program 508 responds to the controller 101A, which has made the inquiry about the mapping, with the address of the storage area in the storage media 103 and the version number of the page that are acquired at Step S1102 and Step S1103, respectively, and ends the series of operation.

Figure 12:
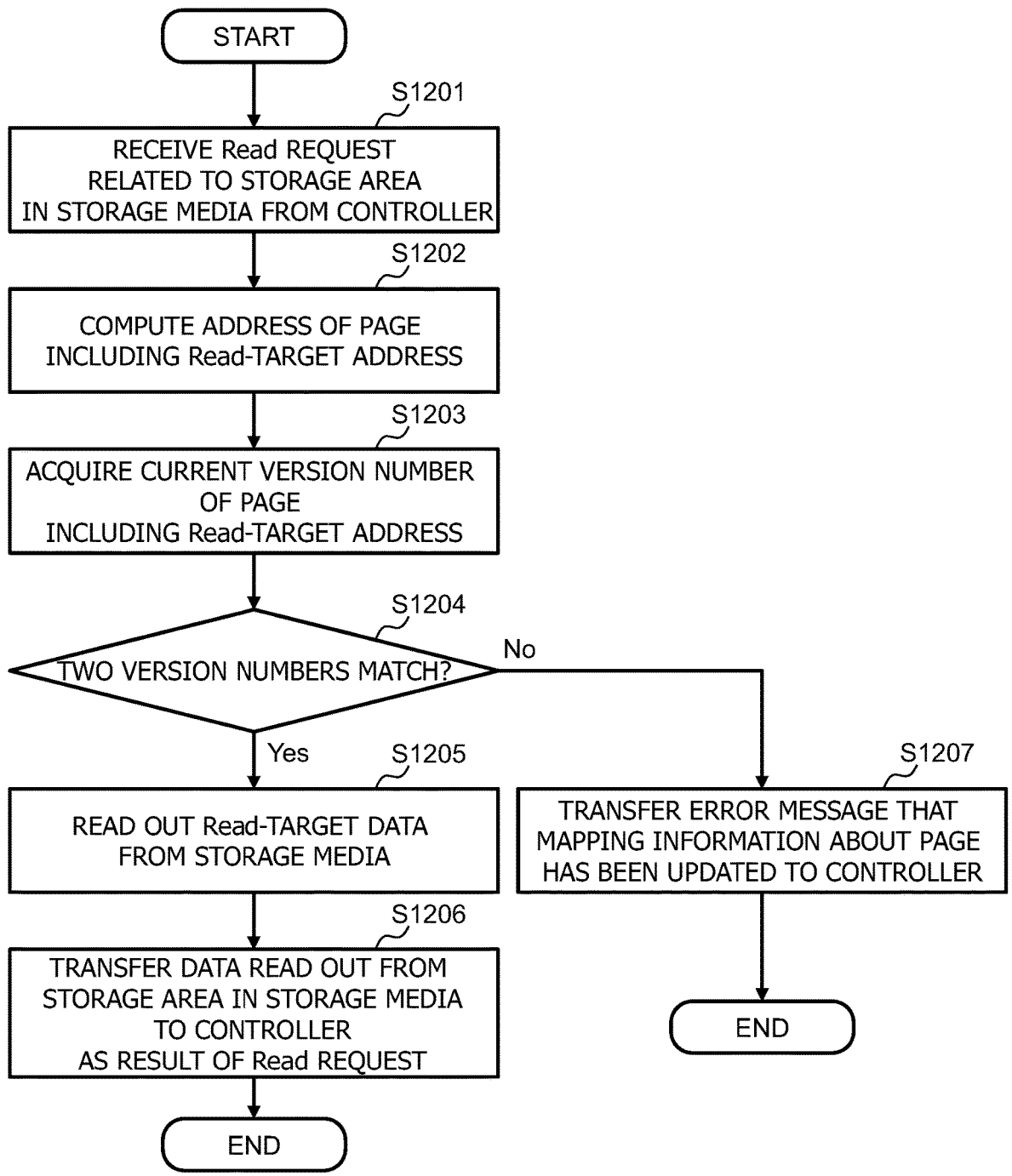
FIG. 12 is a figure depicting an example of a storage medium Read process according to the first embodiment.

FIG. 12 is a figure depicting an example of a flowchart (storage medium Read process) depicting the flow of a series of processes performed when the storage medium node 102 processes a Read request from the controller 101A. Operation based on the flowchart in FIG. 12 is as follows.

Step S1201: The command processing program 801 receives the Read request related to a storage area in the storage media 103 from the controller 101A via the communication interfaces 303. Subsequently, Step S1202 is executed.

Step S1202: The version number checking program 803 computes (identifies) the address of a page including a Read-target address (the address of the storage area in the storage media 103) from the Read request received at Step S1201. Subsequently, Step S1203 is executed.

Step S1203: The version number checking program 803 refers to the version table 901 stored in the metadata area 703 in the memories 302. Then, the version number checking program 803 acquires a current version number corresponding to the address of the page computed at Step S1202. Subsequently, Step S1204 is executed.

Step S1204: The version number checking program 803 compares a version number included in the Read request received at Step S1201 and the version number acquired at Step S1203 with each other. In a case where the version numbers match, Step S1205 is executed, and in a case where the version numbers do not match, Step S1207 is executed.

Step S1205: The I/O control program 802 makes a Read request to the storage media 103, and acquires, from the storage media 103, data of a Read-target address received at Step S1201. The I/O control program 802 stores, in the buffer area 702 in the memories 302, the data acquired from the storage media 103. Subsequently, Step S1206 is executed.

Step S1206: The command processing program 801 transfers the Read result data stored in the buffer area 702 as the result of the Read request to the controller 101A via the communication interfaces 303, and ends the series of operation.

Step S1207: As the result of the Read request, the command processing program 801 transfers, to the controller 101A via the communication interfaces 303, an error message that the version numbers do not match, that is, the mapping information about the data in the page has been updated, and ends the series of operation.

Figure 13:
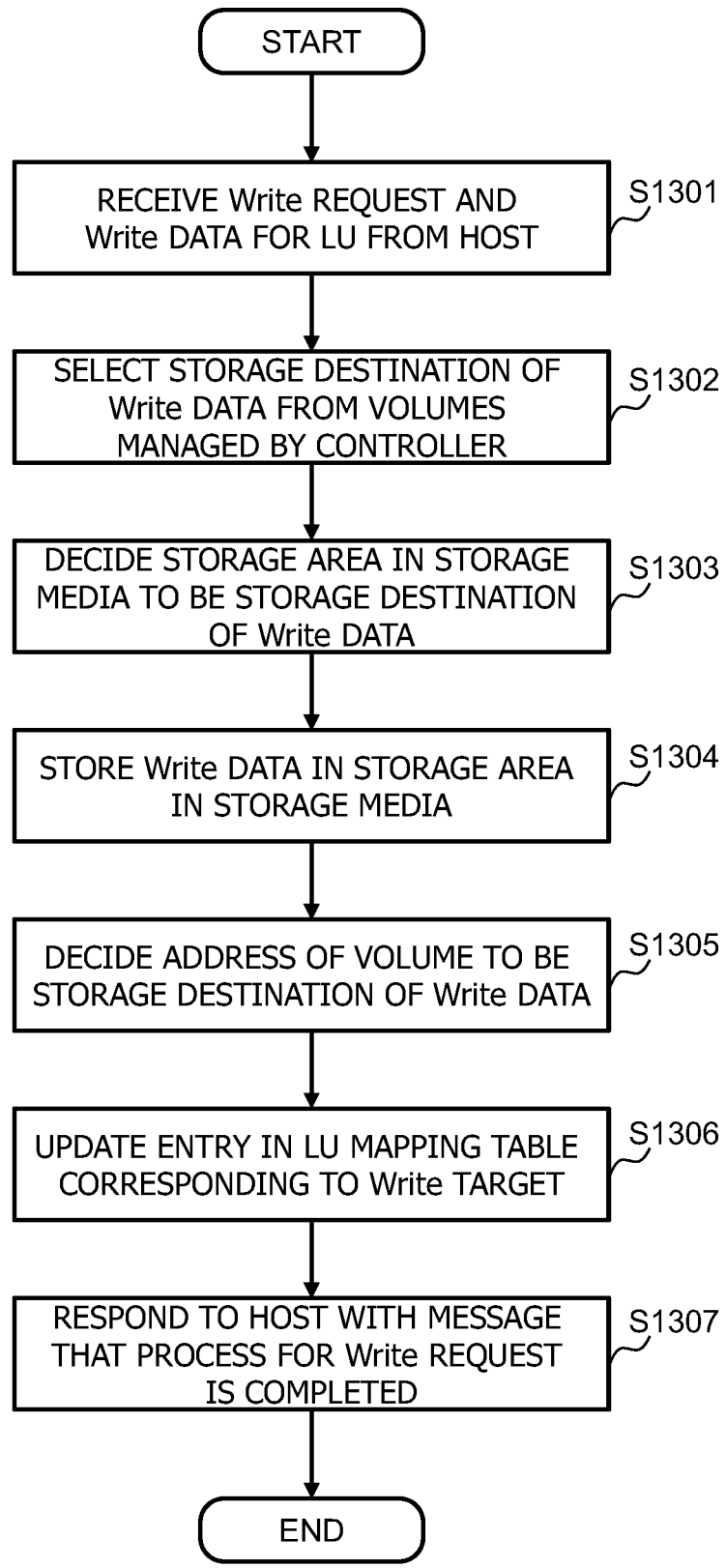
FIG. 13 is a figure depicting an example of a controller Write process according to the first embodiment.

FIG. 13 is a figure depicting an example of a flowchart (controller Write process) depicting the flow of a series of processes that are related to a Write request from the host 110 to an LU 205, and performed at the controller 101A. Operation based on the flowchart in FIG. 13 is as follows.

Step S1301: The command processing program 501 of the controller 101A receives the Write request and Write data from the host 110 to the LU 205 via the host interfaces 204. In addition, the command processing program 501 stores the received Write data in the buffer area 402 in the memories 202. Subsequently, Step S1302 is executed.

Step S1302: The command processing program 501 selects a volume 206 to store the Write data from the volumes 206 managed by the controller 101A. Subsequently, Step S1303 is executed.

Step S1303: The volume control program 504 refers to the volume mapping table 620 stored in the metadata area 403 in the memories 202, and decides the address of a storage area in the storage media 103 to be a storage destination of the Write data. Subsequently, Step S1304 is executed.

Step S1304: Via the communication interfaces 203, the I/O control program 502 transmits, to the storage medium node 102, a Write request for writing the Write data in the address of the storage area in the storage media 103 decided at Step S1303. In addition, the I/O control program 502 reads out the Write data stored at Step S1301 from the buffer area 402 in the memories 202, and transmits as Write data to the storage medium node 102 via the communication interfaces 203. Subsequently, Step S1305 is executed.

Step S1305: The volume control program 504 decides the address of a volume 206 to be associated with the storage area as the storage destination of the Write data. Then, the address of the volume 206 to be associated and the address of the storage area in the storage media 103 are registered in the volume mapping table 620 and the volume reverse lookup table 640. Subsequently, Step S1306 is executed.

Step S1306: The LU control program 503 pays attention to an entry that is in the LU mapping table 610 stored in the metadata area 403 in the memories 202, and corresponds to the Write-target address of the LU 205. Then, the LU control program 503 stores, in the volume ID 611 of the entry, a volume ID representing the volume 206 selected as the storage destination of the Write data at Step S1302, and stores, in the volume address 612 of the entry, the address of the volume 206 associated with the Write-target storage area. Subsequently, Step S1307 is executed.

Step S1307: Via the host interfaces 204, the command processing program 501 responds to the host 110 with a message that the process for the Write request has been completed, and ends the series of operation.

Figure 14:
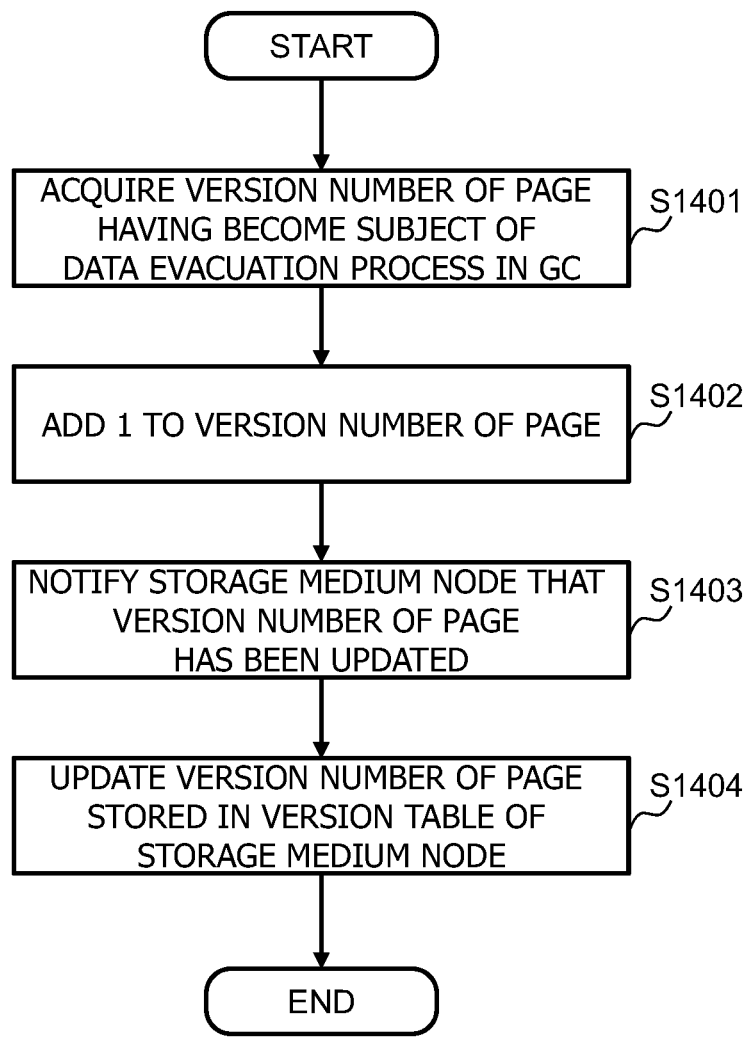
FIG. 14 is a figure depicting an example of a version management process according to the first embodiment.

FIG. 14 is a figure depicting an example of a flowchart (version management process) depicting the flow of a series of processes that are related to page version number updating accompanying GC, and performed at the controller 101A and the storage medium node 102. Operation based on the flowchart in FIG. 14 is as follows.

Step S1401: The version management program 506 of the controller 101A refers to the version table 630 stored in the metadata area 403 in the memories 202, and acquires the version number of a subject page of a data relocation process by the GC program 505. Subsequently, Step S1402 is executed.

Step S1402: The version management program 506 of the controller 101A updates the version table 630 by adding "1" to the version number of the page acquired at Step S1401. Subsequently, Step S1403 is executed.

Step S1403: The version management program 506 of the controller 101A transmits, to the storage medium node 102 via the communication interfaces 203, the address of a storage area in the storage media 103 related to the subject page of the data relocation process by the GC program 505, and the updated version number of the page, to thereby notify that the version number of the page has been updated. Subsequently, Step S1404 is executed.

Step S1404: The version number updating program 804 of the storage medium node 102 receives the update notification about the version number of the page from the controller 101A via the communication interfaces 303. Then, in the version table 901 stored in the metadata area 703 in the memories 302, the version number updating program 804 updates the version number according to the received notification, and ends the series of operation.

Note that in the operation at Step S1403, the method of updating the version number is not limited to the one in which "1" is added. In addition, the update notification about the version number of the page from the controller 101A to the storage medium node 102 in the operation at Step S1403 may include the address of the page, but not include the updated version number of the page, in other possible configuration. In this case, the version number updating program 804 of the storage medium node 102 needs to acquire the un-updated version number of the page by referring to the version table 901 in the operation at Step S1404, update the version number, and store it in the version table 901.

Figure 15:
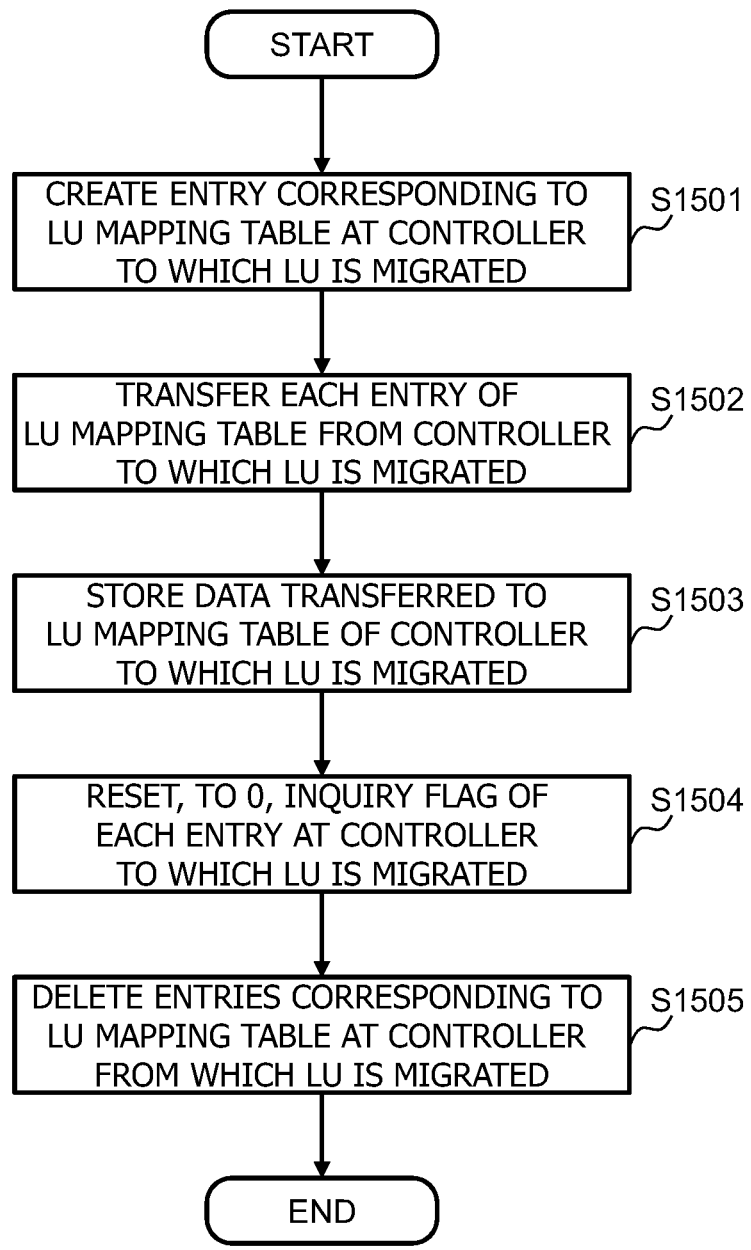
FIG. 15 is a figure depicting an example of an LU migration process according to the first embodiment.

FIG. 15 is a figure depicting an example of a flowchart (LU migration process) depicting the flow of a series of processes an initialization process in which an LU 205 having been controlled (managed) by the controller 101B is migrated to the controller 101A, and is controlled by the controller 101A. Operation based on the flowchart in FIG. 15 is as follows.

Step S1501: At the controller 101A to which the LU 205 is migrated, the LU control program 503 creates an entry corresponding to the migration-subject LU 205 in the LU mapping table 610 stored in the metadata area 403 in the memories 202 of the controller 101A. Subsequently, Step S1502 is executed.

Step S1502: At the controller 101B from which the LU 205 is migrated, the LU control program 503 acquires the volume ID 611 and volume address 612 of each entry corresponding to the migration-subject LU 205 from the LU mapping table 610 stored in the metadata area 403 in the memories 202 of the controller 101B, and transfers them to the controller 101A via the communication interfaces 203. Subsequently, Step S1503 is executed.

Step S1503: The LU control program 503 of the controller 101A receives the volume ID 611 and volume address 612 of each entry corresponding to the migration-subject LU 205 from the controller 101B via the communication interfaces 203. Then, the LU control program 503 stores them in a corresponding entry in the LU mapping table 610 created at Step S1501. Subsequently, Step S1504 is executed.

Step S1504: The LU control program 503 of the controller 101A resets, to "0," the inquiry flag 614 of each entry in the LU mapping table 610 in which the volume ID 611 and volume address 612 have been stored at Step S1503. Subsequently, Step S1505 is executed.

Step S1505: The LU control program 503 of the controller 101B deletes the entry corresponding to the migration-subject LU 205 from the LU mapping table 610, and ends the series of operation.

According to the present embodiment, in the storage system in which the plurality of controllers share the storage media, inter-controller synchronization of mapping information is possible while avoiding reference to mapping information for the purpose of identifying the destinations of notifications about updating between the controllers. By performing the inter-controller synchronization of mapping information while avoiding reference to mapping information, overheads in GC and Write processes by controllers are avoided, and performance deterioration is reduced.

(2) Second Embodiment

In an example explained in the present embodiment, in the storage system in which the plurality of controllers share the storage media, each controller checks whether mapping information that the controller has referred to in advance in the controller has been updated when the controller makes a Read request to the storage medium node. Note that the present embodiment does not limit claims in the present invention, and all elements that are explained in the embodiment are not necessarily necessary for a solution to the problems in the present invention. In addition, in the explanation of the present embodiment, differences from the configuration and operation in the first embodiment are explained, and configuration and operation which are not explained may be regarded as being identical to those in the first embodiment.

Figure 16:
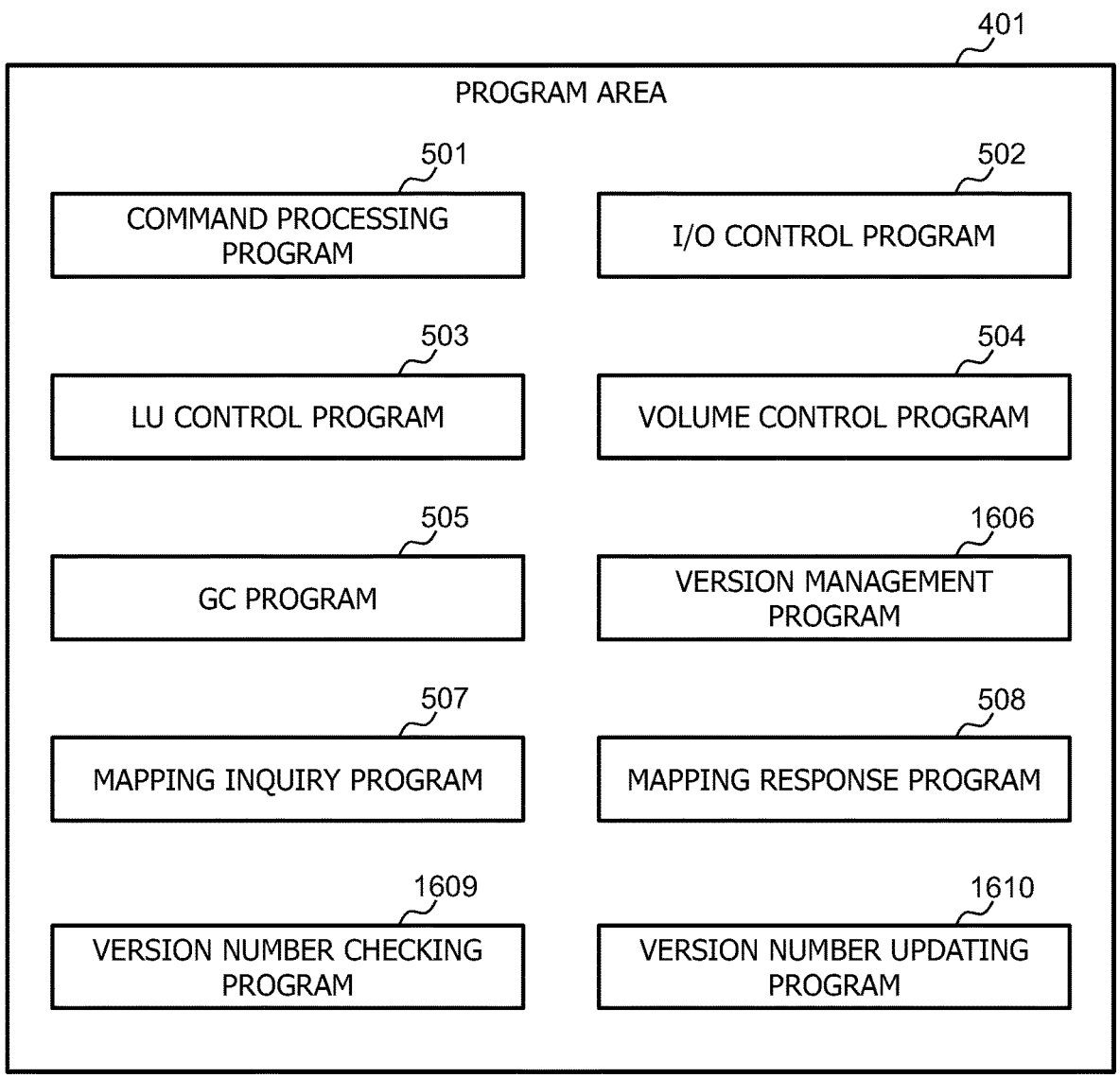
FIG. 16 is a figure depicting an example of the configuration of the program area included in the memories of the controller according to a second embodiment.

FIG. 16 is a figure depicting an example of the configuration of the program area 401 included in the memories 202 of the controller 101.

The program area 401 stores the command processing program 501, the I/O control program 502, the LU control program 503, the volume control program 504, the GC program 505, a version management program 1606, the mapping inquiry program 507, the mapping response program 508, a version number checking program 1609, and a version number updating program 1610.

The version management program 1606 updates the version number of the page as instructed by the GC program 505, and notifies another controller 101 via the communication interfaces 203 that the version number of the page has been updated.

The version number checking program 1609 identifies a page corresponding to a Read-planned address in a storage area in the storage media 103, compares the version number of the identified page and a version number associated with mapping information about a volume 206 referred to with each other, and determines whether or not the version number associated with the mapping information referred to matches the version number of the page.

Via the communication interfaces 203, the version number updating program 1610 receives the address of a page, and a new version number from another controller 101, and updates information that is retained by the storage medium node 102, and is about the version number of each page. Note that a notification related to updating of the version number of a page that the version number updating program 1610 receives from the controller 101 is not limited to the format described above. For example, in a case where the version number of each page starts from "0," and "1" is necessarily added thereto at a time of updating, the version number of each page is initialized to "0" in advance, and only the addresses of pages whose version numbers have been changed may be received from controllers 101, in one possible format.

Figure 17:
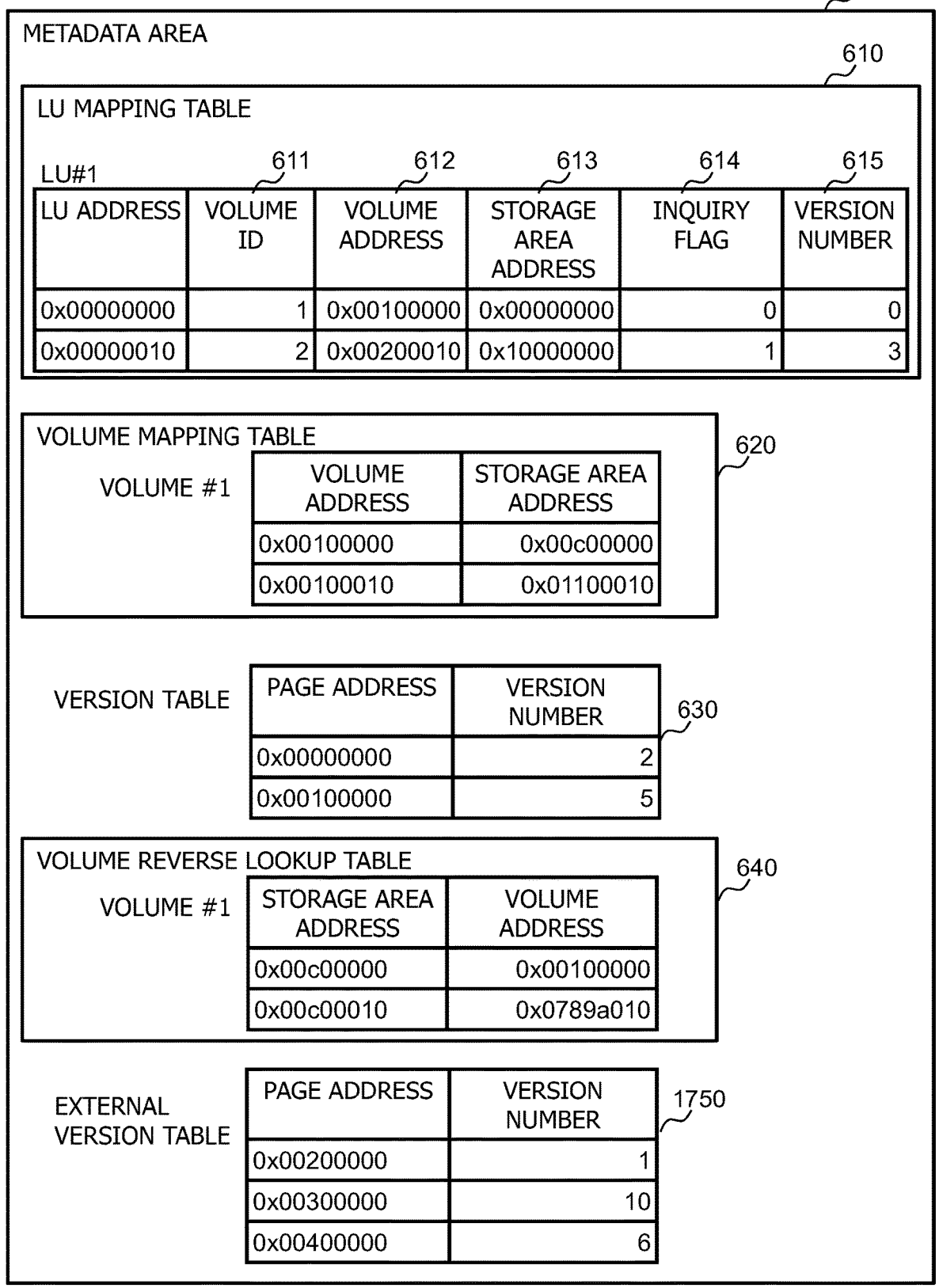
FIG. 17 is a figure depicting an example of the configuration of the metadata area included in the memories of the controller according to the second embodiment.

FIG. 17 is a figure depicting an example of the configuration of the metadata area 403 included in the memories 202 of the controller 101.

The metadata area 403 includes the LU mapping table 610, the volume mapping table 620, the version table 630, the volume reverse lookup table 640, and an external version table 1750.

The external version table 1750 stores the current version number of each page managed by another controller 101 included in a storage area in the storage media 103.

Figure 18:
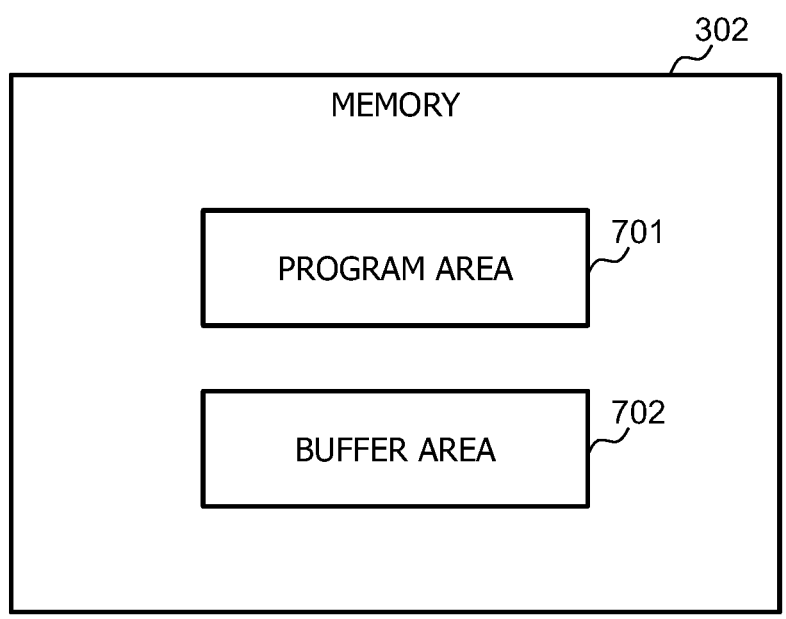
FIG. 18 is a figure depicting an example of the areas in the memories included in the storage medium node according to the second embodiment.

FIG. 18 is a figure depicting an example of areas (the configuration of stored data) in the memories 302 included in the storage medium node 102. The memories 302 include the program area 701 and the buffer area 702.

Figure 19:
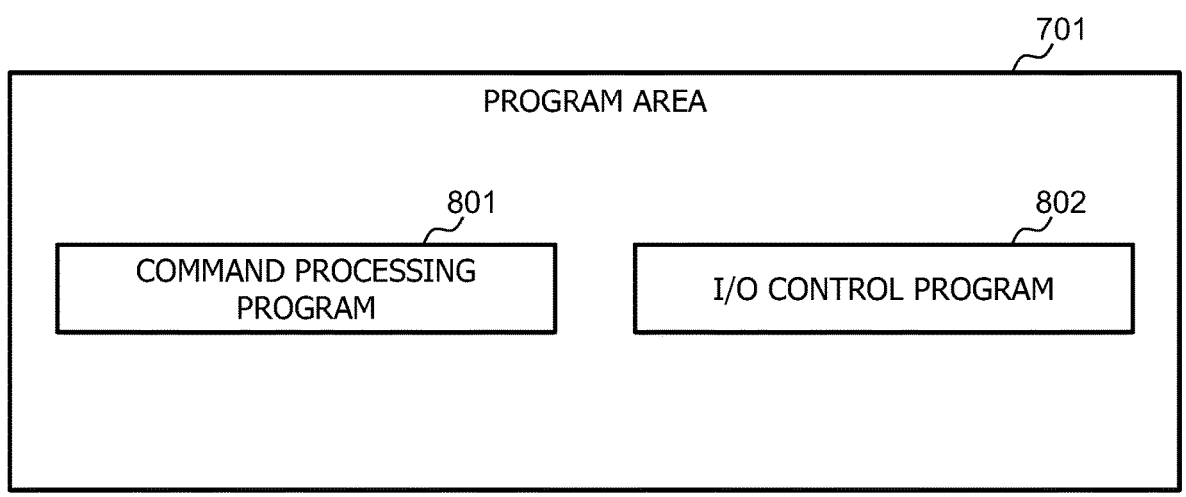
FIG. 19 is a figure depicting an example of the configuration of the program area included in the memories of the storage medium node according to the second embodiment.

FIG. 19 is a figure depicting an example of the configuration of the program area 701 included in the memories 302 of the storage medium node 102. The program area 701 stores the command processing program 801 and the I/O control program 802.

Figure 20A:
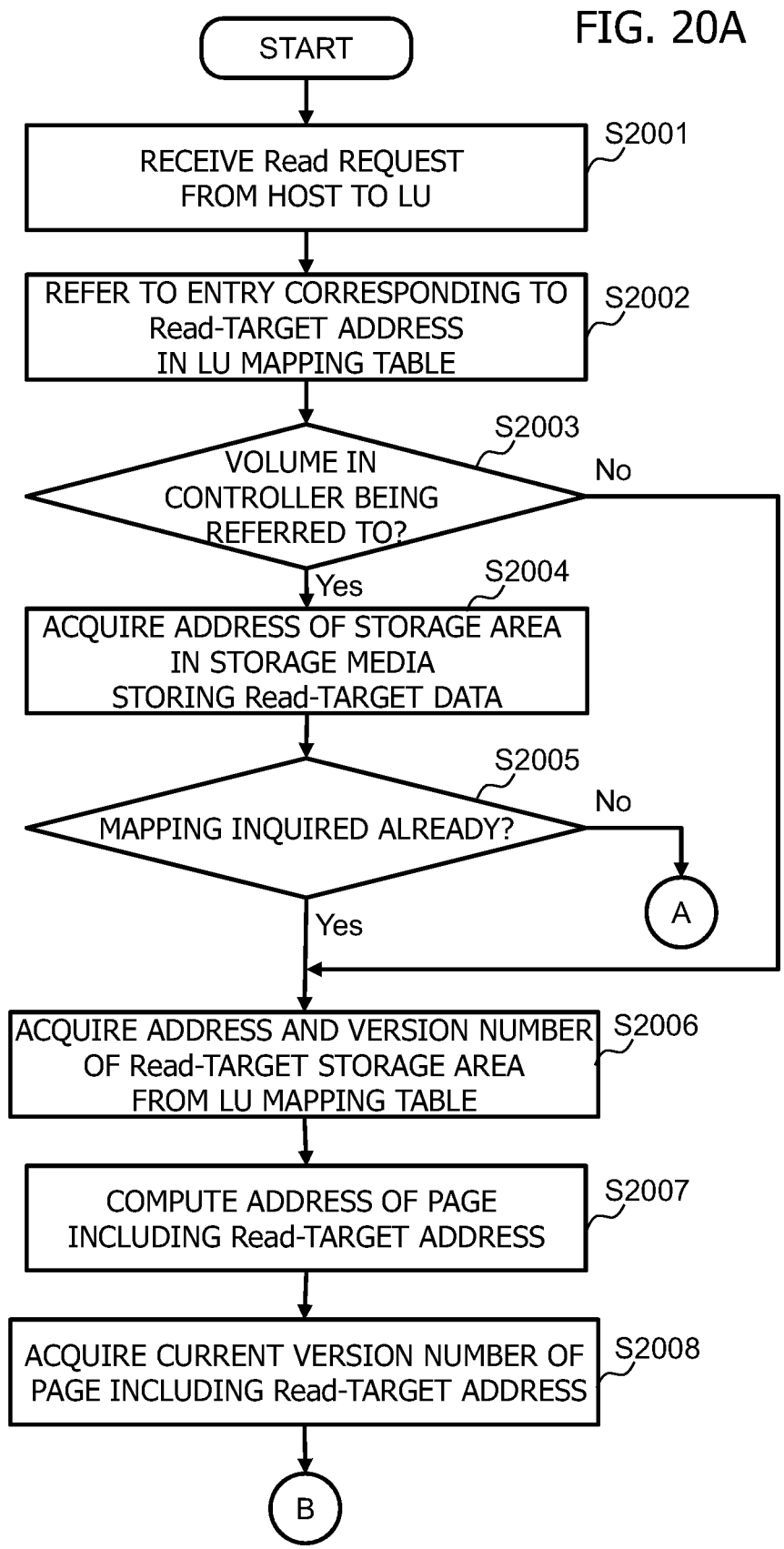
FIG. 20A is a figure depicting an example of the controller Read process according to the second embodiment.

FIG. 20A and FIG. 20B are figures depicting an example of a flowchart (controller Read process) depicting the flow of a series of processes that are related to a Read request from the host 110 to an LU 205, and performed at the controller 101A. Operation based on the flowchart in FIG. 20A and FIG. 20B are as follows.

Step S2001: The command processing program 501 of the controller 101A receives the Read request from the host 110 to the LU 205 via the host interfaces 204. Subsequently, Step S2002 is executed.

Step S2002: The LU control program 503 receives a Read-target address (e.g. the address of the LU 205) from the command processing program 501, and refers to an entry corresponding to the Read-target address in the LU mapping table 610 in the metadata area 403 in the memories 202. Subsequently, Step S2003 is executed.

Step S2003: The LU control program 503 refers to the volume ID 611 in the entry referred to at Step S2002 and the volume mapping table 620, and checks whether the controller 101A has a volume 206 which is being referred to. In a case where it is checked as a result that the controller 101A manages the volume 206 being referred to, Step S2004 is executed. Otherwise, that is, in a case where the controller 101B manages it, Step S2006 is executed. Note that in a case where the access target is a volume 206 in the controller 101A, the LU control program 503 performs a process of checking whether the entry has been initialized, and, in a case where it has not been initialized, the address and version number of the Read-target storage area are acquired, and thereby a version number comparison process can be omitted.

Step S2004: The volume control program 504 refers to the volume mapping table 620 corresponding to the volume ID 611 included in the entry referred to at Step S2002. Then, the volume control program 504 refers to an entry in the volume mapping table 620 corresponding to the volume address 612 included in the entry referred to at Step S2002, and acquires the address of a storage area in the storage media 103 corresponding to the address of the Read-target LU 205. Subsequently, Step S2005 is executed.

Step S2005: The LU control program 503 refers to the inquiry flag 614 included in the entry referred to at Step S2002, and checks whether the mapping has already been inquired. In a case where the mapping has already been inquired, Step S2006 is executed, and in a case where the mapping has not already been inquired, Step S2010 is executed.

Step S2006: The LU control program 503 refers to the LU mapping table 610, and acquires the storage area address 613 and version number 615 included in the entry referred to at Step S2002 as the address of a storage area in the storage media 103 corresponding to the address of the Read-target LU 205, and as the version number of a page corresponding to the address of the Read-target LU 205. Subsequently, Step S2007 is executed.

Step S2007: The version number checking program 1609 computes the address of a page including the address of the storage area in the storage media 103 acquired at Step S2006. Subsequently, Step S2008 is executed.

Step S2008: The version number checking program 1609 refers to the external version table 1750 stored in the metadata area 403 in the memories 202. Then, the version number checking program 1609 acquires the current version number related to the address of the page computed at Step S2007. Subsequently, Step S2009 is executed.

Step S2009: The version number checking program 1609 compares the version number acquired from the entry in the LU mapping table 610 at Step S2006 and the version number of the page acquired from the external version table 1750 at Step S2008 with each other. Then, in a case where the version numbers match, Step S2011 is executed, and in a case where the version numbers do not match, Step S2010 is executed.

Step S2010: The mapping inquiry program 507 inquires, of the controller 101B managing the volume 206, mapping information related to the volume ID 611 and volume address 612 included in the entry referred to at Step S2002. Then, as an inquiry result from the controller 101B, the mapping inquiry program 507 acquires the address of a storage area in the storage media 103 corresponding to the volume ID 611 and volume address 612 that are described above, and the version number of a page including the address. The mapping inquiry program 507 stores the acquired address and version number in the storage area address 613 and version number 615 that are included in the entry in the LU mapping table 610 referred to at Step S2002, and sets the inquiry flag 614 in the entry to "1." Subsequently, Step S2012 is executed.

Step S2011: Via the communication interfaces 203, the I/O control program 502 makes a Read request to the storage medium node 102 for the acquired address in the storage area in the storage media 103. Subsequently, Step S2012 is executed.

Step S2012: The I/O control program 502 receives a response related to the Read request made at Step S2011 from the storage medium node 102 via the communication interfaces 203, and also stores Read result data in the buffer area 402 in the memories 202. Subsequently, Step S2013 is executed.

Step S2013: The command processing program 501 transfers the Read result data stored in the buffer area 402 to the host 110 via the host interfaces 204 as the result of the Read request, and ends the series of operation.

FIG. 21 is a figure depicting an example of a flowchart (storage medium Read process) depicting the flow of a series of processes performed when the storage medium node 102 processes a Read request from the controller 101A. Operation based on the flowchart in FIG. 21 is as follows.

Step S2101: The command processing program 801 receives the Read request related to a storage area in the storage media 103 from the controller 101A via the communication interfaces 303. Subsequently, Step S2102 is executed.

Step S2102: The I/O control program 802 makes a Read request to the storage media 103, and acquires, from the storage media 103, data of a Read-target address received at Step S2101. The I/O control program 802 stores, in the buffer area 702 in the memories 302, the data acquired from the storage media 103. Subsequently, Step S2103 is executed.

Step S2103: The command processing program 801 transfers the Read result data stored in the buffer area 702 as the result of the Read request to the controller 101A via the communication interfaces 303, and ends the series of operation.

FIG. 22 is a figure depicting an example of a flowchart (version management process) depicting the flow of a series of processes performed at the controller 101A about version number updating of a page accompanying GC executed at the controller 101A. Operation based on the flowchart in FIG. 22 is as follows.

Step S2201: The version management program 1606 of the controller 101A refers to the version table 630 stored in the metadata area 403 in the memories 202, and acquires the version number of a subject page of a data relocation process by the GC program 505. Subsequently, Step S2202 is executed.

Step S2202: The version management program 1606 of the controller 101A updates the version table 630 by adding "1" to the version number of the page acquired at Step S2201. Subsequently, Step S2203 is executed.

Step S2203: The version management program 1606 of the controller 101A transmits, to all the other controllers 101, that is, to the controller 101B, via the communication interfaces 203, the address of a storage area in the storage media 103 related to the subject page of the data relocation process by the GC program 505, and the updated version number of the page, to thereby notify that the version number of the page has been updated. Subsequently, Step S2204 is executed.

Step S2204: The version number updating program 1610 of the controller 101B receives the update notification about the version number of the page from the controller 101A via the communication interfaces 203. Then, in the external version table 1750 stored in the metadata area 403 in the memories 202, the version number updating program 1610 updates the version number of the page according to the received notification, and ends the series of operation.

According to the present embodiment, in the storage system in which the plurality of controllers share the storage media, inter-controller synchronization of mapping information is possible while avoiding reference to mapping information for the purpose of identifying the destinations of notifications about updating between the controllers; in addition, a Read request to the storage medium node can be avoided in a case where mapping information has been updated. By performing the inter-controller synchronization of the mapping information while avoiding reference to mapping information, overheads in GC and Write processes by controllers are avoided, and performance deterioration is reduced.

(III) Notes

The present invention is not limited to the embodiments mentioned above, and includes various derived forms. For example, whereas each functionality of the controllers 101 is executed by software that operates on the processors 201 in the embodiments mentioned above, some or all of the functionalities may be executed by hardware. In addition, whereas the controllers 101 and the storage medium node 102 are connected to each other by the network 104 in the embodiments mentioned above, these may be located in the same housing or may be connected by a bus, a backplane or the like in the same hardware. Additionally, whereas the LU mapping table 610, volume mapping table 620, version table 630, and volume reverse lookup table 640 of the controllers 101 are stored in the metadata area 403 in the memories 202 in the embodiments mentioned above, some or all of them may be stored in a storage area configured by using the storage media 103 connected to the storage medium node 102.

Whereas the present invention is applied to a storage system in the case mentioned in the embodiments mentioned above, the present invention is not limited to this, but can be applied widely to other various systems, apparatuses, methods, and programs.

In addition, the configuration of each table depicted in the embodiments mentioned above is one example, and one table may be divided into two or more tables, or some of all of two or more tables may be integrated into one table.

In addition, information such as a program, a table, or a file that realizes each functionality in the explanation described above can be placed on a storage apparatus such as a memory, a hard disk, or a solid state drive (SSD) or a recording medium such as an IC card, an SD card, or a DVD.

The embodiments mentioned above include the following characteristic configuration, for example.

(1)

A storage system (e.g. the storage system 100) including: a plurality of controllers (e.g. the controllers 101), and a storage apparatus (e.g. the storage medium node 102) accessed by the plurality of controllers, data management of a storage area (e.g. a page or a storage medium 103) in the storage apparatus being assigned to one of the plurality of controllers, in which a first controller (e.g. a controller 101 to which an LU 205 is migrated) manages first mapping information (e.g. the LU mapping table 610 and the volume mapping table 620 or an LU address, a volume ID, a volume address, a storage area address, etc.) for accessing data stored in a storage area, management of which is assigned to the first controller, and second mapping information (e.g. the LU mapping table 610 or a volume ID, a volume address, a storage area address, etc.) for accessing data stored in a predetermined storage area (e.g. a page corresponding to a predetermined LU), management of which is assigned to a second controller, the second controller, when having executed garbage collection (e.g. GC) on the predetermined storage area, changes mapping information for accessing the data stored in the predetermined storage area to post-migration mapping information for accessing data after being migrated by the garbage collection, and the first controller acquires the post-migration mapping information from the second controller, and updates the second mapping information by using the post-migration mapping information in a case where information that is in the second mapping information and is to be used for accessing the data in the predetermined storage area has been updated accompanying the garbage collection when the first controller accesses the data in the predetermined storage area after the garbage collection by using the second mapping information (e.g. when a Read request for the data in the predetermined storage area is made, when a process is executed at a predetermined timing for a Read request for data whose inquiry flag is "0," and which is stored in a storage area managed by another controller).

In the configuration described above, for example, when data in a storage area on which garbage collection has been executed is accessed by using mapping information, updating of the mapping information accompanying the garbage collection is executed to thereby avoid reference to the mapping information for the purpose of giving notifications about the updating among the controllers. According to the configuration described above, for example, it is possible to reduce overheads accompanying reference to mapping information in garbage collection, and to reduce performance deterioration of the garbage collection.

(2)

The storage apparatus, when receiving, from the first controller, a read-out request for the data in the predetermined storage area, and predetermined version information representing a version of the predetermined storage area at a timing of registration of the second mapping information (e.g. at a timing of an inquiry about mapping), determines whether or not the predetermined version information and version information about a latest version of the predetermined storage area match (e.g. see Step S1204), and, if the predetermined version information and the version information do not match, transmits, to the first controller, response information representing that the predetermined version information has been updated (e.g. see Step S1207), and the first controller, when receiving the response information, acquires the post-migration mapping information from the second controller, and updates the second mapping information by using the post-migration mapping information (e.g. see Step S1010 and Step S1008).

In the configuration described above, for example, when a request is made to read out data by using mapping information at each controller, updating of the mapping information accompanying garbage collection is executed to thereby avoid reference to the mapping information for the purpose of giving notifications about the updating among the controllers. In addition, because, for example, it is decided at the storage apparatus whether it is necessary to update mapping information in the configuration described above, it is made easy to manage the latest version of each storage area even in a case where the number of controllers increase or decrease.

(3)

The second controller, when having executed the garbage collection, transmits, to the storage apparatus, updated version information (e.g. a version number or a version different from the current version) representing that the version of the predetermined storage area has been updated (e.g. see Step S1403), the storage apparatus, when receiving the updated version information from the second controller, manages the updated version information as latest version information about the predetermined storage area (e.g. see Step S1404), and the first controller, when receiving the response information, acquires, from the second controller, the post-migration mapping information and post-migration version information representing a version of a storage area where the data is stored after being migrated by the garbage collection, updates the second mapping information by using the post-migration mapping information, and changes the predetermined version information about the predetermined storage area to the post-migration version information about the storage area to which the data has been migrated (e.g. see Step S1008).

(4)

The storage apparatus transmits, as the response information, to the first controller, error information representing that an attempt to read out the data in the predetermined storage area has failed (e.g. see Step S1207).

(5)

The first controller determines, on a basis of a read-out request for the data in the predetermined storage area, whether or not version information about a latest version of the predetermined storage area and predetermined version information representing a version of the predetermined storage area at a timing of registration of the second mapping information match (e.g. see Step S2009), and, if the version information and the predetermined version information do not match, acquires the post-migration mapping information from the second controller, and updates the second mapping information by using the post-migration mapping information (e.g. see Step S2010).

In the configuration described above, for example, when a request is made to read out data by using mapping information at each controller, updating of the mapping information accompanying garbage collection is executed to thereby avoid reference to the mapping information for the purpose of giving notifications about the updating among the controllers. In addition, in the configuration described above, it is possible to reduce communication between controllers and the storage apparatus when data in storage areas is read out, as compared with a case where it is decided at the storage apparatus whether it is necessary to update the mapping information because it is decided at each controller whether it is necessary to update mapping information, for example.

(6)

The second controller, when having executed the garbage collection, transmits, to all other controllers, updated version information representing that the version of the predetermined storage area has been updated (e.g. see Step S2203), a controller that has received the updated version information manages the updated version information as latest version information about the predetermined storage area (e.g. see Step S2204), and the first controller acquires, when the version information about the latest version and the predetermined version information do not match, from the second controller, the post-migration mapping information and post-migration version information representing a version of a storage area where the data is stored after being migrated by the garbage collection, updates the second mapping information by using the post-migration mapping information, and changes the predetermined version information about the predetermined storage area to the post-migration version information about the storage area to which the data has been migrated (e.g. see Step S2010).

In addition, the configuration mentioned above may be subjected to changes, rearrangement, combination, or omission as appropriate within the scope of the gist of the present invention.

The invention claimed is:

1. A storage system comprising: a plurality of controllers; and a storage apparatus accessed by the plurality of controllers, data management of a storage area in the storage apparatus being assigned to one of the plurality of controllers, wherein a first controller manages first mapping information for accessing data stored in a storage area, management of which is assigned to the first controller, and second mapping information for accessing data stored in a predetermined storage area, management of which is assigned to a second controller, the second controller, when having executed garbage collection on the predetermined storage area, changes mapping information for accessing the data stored in the predetermined storage area to post-migration mapping information for accessing data after being migrated by the garbage collection, and the first controller acquires the post-migration mapping information from the second controller, and updates the second mapping information by using the post-migration mapping information in a case where information that is in the second mapping information and is to be used for accessing the data in the predetermined storage area has been updated accompanying the garbage collection when the first controller accesses the data in the predetermined storage area after the garbage collection by using the second mapping information.

2. The storage system according to claim 1, wherein the storage apparatus, when receiving, from the first controller, a read-out request for the data in the predetermined storage area, and predetermined version information representing a version of the predetermined storage area at a timing of registration of the second mapping information, determines whether or not the predetermined version information and version information about a latest version of the predetermined storage area match, and, if the predetermined version information and the version information do not match, transmits, to the first controller, response information representing that the predetermined version information has been updated, and the first controller, when receiving the response information, acquires the post-migration mapping information from the second controller, and updates the second mapping information by using the post-migration mapping information.

3. The storage system according to claim 2, wherein the second controller, when having executed the garbage collection, transmits, to the storage apparatus, updated version information representing that the version of the predetermined storage area has been updated, the storage apparatus, when receiving the updated version information from the second controller, manages the updated version information as latest version information about the predetermined storage area, and the first controller, when receiving the response information, acquires, from the second controller, the post-migration mapping information and post-migration version information representing a version of a storage area where the data is stored after being migrated by the garbage collection, updates the second mapping information by using the post-migration mapping information, and changes the predetermined version information about the predetermined storage area to the post-migration version information about the storage area to which the data has been migrated.

4. The storage system according to claim 2, wherein the storage apparatus transmits, as the response information, to the first controller, error information representing that an attempt to read out the data in the predetermined storage area has failed.

5. The storage system according to claim 1, wherein the first controller determines, on a basis of a read-out request for the data in the predetermined storage area, whether or not version information about a latest version of the predetermined storage area and predetermined version information representing a version of the predetermined storage area at a timing of registration of the second mapping information match, and, if the version information and the predetermined version information do not match, acquires the post-migration mapping information from the second controller, and updates the second mapping information by using the post-migration mapping information.

6. The storage system according to claim 5, wherein
the second controller, when having executed the garbage collection, transmits, to all other controllers, updated version information representing that the version of the predetermined storage area has been updated,
a controller that has received the updated version information manages the updated version information as latest version information about the predetermined storage area, and
the first controller acquires, when the version information about the latest version and the predetermined version information do not match, from the second controller, the post-migration mapping information and post-migration version information representing a version of a storage area where the data is stored after being migrated by the garbage collection, updates the second mapping information by using the post-migration mapping information, and changes the predetermined version information about the predetermined storage area to the post-migration version information about the storage area to which the data has been migrated.

7. A data management method performed in a storage system including a plurality of controllers, and a storage apparatus accessed by the plurality of controllers, data management of a storage area in the storage apparatus being assigned to one of the plurality of controllers, the data management method comprising:
managing, by a first controller, first mapping information for accessing data stored in a storage area, management of which is assigned to the first controller, and second mapping information for accessing data stored in a predetermined storage area, management of which is assigned to a second controller,
changing, by the second controller, when having executed garbage collection on the predetermined storage area, mapping information for accessing the data stored in the predetermined storage area to post-migration mapping information for accessing data after migration by the garbage collection, and
acquiring, by the first controller, the post-migration mapping information from the second controller, and updating the second mapping information by using the post-migration mapping information in a case where information that is in the second mapping information and is to be used for accessing the data in the predetermined storage area has been updated accompanying the garbage collection when the first controller accesses the data in the predetermined storage area after the garbage collection by using the second mapping information.

* * * * *